(12) United States Patent
Farkas et al.

(10) Patent No.: US 11,323,384 B2
(45) Date of Patent: May 3, 2022

(54) PACKET PROCESSING TECHNIQUE FOR A COMMUNICATION NETWORK

(71) Applicant: Telefonaktiebolaget LM Ericsson (publ), Stockholm (SE)

(72) Inventors: János Farkas, Kecskemét (HU); Stefano Ruffini, Rome (IT); Balázs Varga, Budapest (HU); Csaba Simon, Budapest (HU); István Moldován, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 16/321,003

(22) PCT Filed: Jul. 26, 2016

(86) PCT No.: PCT/EP2016/067819

§ 371 (c)(1),
(2) Date: Jan. 25, 2019

(87) PCT Pub. No.: WO2018/019367

PCT Pub. Date: Feb. 1, 2018

(65) Prior Publication Data

US 2019/0166061 A1    May 30, 2019

(51) Int. Cl.
*H04L 12/863* (2013.01)
*H04L 12/869* (2013.01)
(Continued)

(52) U.S. Cl.
CPC .......... *H04L 47/621* (2013.01); *H04L 47/245* (2013.01); *H04L 47/58* (2013.01); *H04L 47/627* (2013.01); *H04L 47/6275* (2013.01)

(58) Field of Classification Search
CPC . H04L 45/38; H04L 61/2514; H04L 61/2517; H04L 61/256; H04L 61/2521
See application file for complete search history.

(56) References Cited

U.S. PATENT DOCUMENTS 6,208,654 B1 *  3/2001  Moteki ............. H04Q 11/0478
                                                          370/395.2
2002/0085553 A1 *  7/2002  Ku ...................... H04L 49/101
                                                          370/389
(Continued)

OTHER PUBLICATIONS

IEE Draft, vol. 802.1, No. vo4, Jan. 2015, Finn, Norman.*
(Continued)

*Primary Examiner* — Gary Mui
*Assistant Examiner* — Mohammed M Murshid
(74) *Attorney, Agent, or Firm* — NDWE LLP

(57) ABSTRACT

A system comprising one or more network elements and configured to process at least first and second packet flows. The system comprises a first packet gate selectively switchable between an open state for packet transmission and a closed state and an associated first packet queue. The first packet gate and the first packet queue are configured to handle first packet flow packets. The system further comprises a second packet queue configured to handle second packet flow packets. Moreover, the system comprises at least one processor configured to control switching of the first packet gate between the open state and the closed state based on the occurrence of a first event associated with the second packet queue to trigger transmission of the first packet flow packets in a relative transmission order among the first packet flow packets and the second packet flow packets.

18 Claims, 14 Drawing Sheets

(51) Int. Cl.
| | |
|---|---|
| H04L 12/851 | (2013.01) |
| H04L 12/865 | (2013.01) |
| H04L 47/62 | (2022.01) |
| H04L 47/50 | (2022.01) |
| H04L 47/24 | (2022.01) |
| H04L 47/625 | (2022.01) |
| H04L 47/6275 | (2022.01) |

(56) References Cited

U.S. PATENT DOCUMENTS

| | | | | |
|---|---|---|---|---|
| 2009/0238089 A1* | 9/2009 | Kitajima | ................ | H04L 45/28 370/252 |
| 2017/0041243 A1* | 2/2017 | Nakayasu | ............... | H04L 47/56 |
| 2019/0007344 A1* | 1/2019 | Mangin | .................. | H04L 47/58 |

OTHER PUBLICATIONS

Norman Finn, Scheduled Queues, UBS, CQF, and Input Gates, IEEE Draft, vol. 802.1, No. v04, Jan. 15, 2015 (Year: 2015).*

Communication pursuant to Article 94(3) EPC, EP App. No. 16745449.5, dated Oct. 25, 2019, 10 pages.

International Preliminary Report on Patentability, PCT App. No. PCT/EP2016/067819, dated Feb. 7, 2019, 8 pages.

IEEE Std 802.1Qbv™-2015, "Bridges and Bridged Networks Amendment 25: Enhancements for Scheduled Traffic," IEEE Standard for Local and metropolitan area networks, Dec. 5, 2015, 57 pages.

IEEE Std 802.1Qci™-2017, "Bridges and Bridged Networks—Amendment 28: Per-Stream Filtering and Policing," IEEE Standard for Local and metropolitan area networks, Feb. 14, 2017, 65 pages.

Communication pursuant to Article 94(3) EPC, EP App. No. 16745449.5, dated Sep. 11, 2020, 6 pages.

International Search Report and Written Opinion for Application No. PCT/EP2016/067819, dated Apr. 3, 2017, 12 pages.

Norman Finn, "Scheduled queues, UBS, CQF, and Input Gates," Jan. 14, 2015, 30 pages, V04, Cisco Systems.

Johannes Specht, "Urgency Based Scheduler, Performance and Characteristics," Nov. 14, 2013, 24 pages.

"IEEE IEEE P802.1Qci/D0.2, Draft Standard for Local and Metropolitan Area Networks—Bridges and Bridged Networks—Amendment: Per-Stream Filtering and Policing," Nov. 4, 2015, 34 pages.

Tao Wan et al., "A Performance Study of CPRI over Ethernet with IEEE 802.1Qbu and 802.1Qbv Enhancements," 2015, 6 pages, IEEE.

Johannes Specht et al., "Considerations on Ingress Policing for 802.1Qbv," Nov. 5, 2014, 20 pages.

Morman Finn, "802.1Qav + P802.1Qbv Time-gated Shapers," Nov. 5, 2014, 12 pages, V01, Cisco Systems.

* cited by examiner

PACKET PROCESSING TECHNIQUE FOR A COMMUNICATION NETWORK

CROSS-REFERENCE TO RELATED APPLICATIONS

This application is a National stage of International Application No. PCT/EP2016/067819, filed Jul. 26, 2016, which is hereby incorporated by reference.

TECHNICAL FIELD

The present disclosure generally relates to communication networks. In particular, a packet processing technique for a communication network is described in which multiple packet flows are transferred. The technique may be implemented in the form of methods, devices, networks and computer programs.

BACKGROUND

Traffic generated by time critical applications has typically been transported in proprietary dedicated networks such as Cobranet, ISO/IEC 62439, 61158 or 61784, and Avionics Full-Duplex Switched Ethernet (AFDX). Recent developments attempt to move time critical traffic to packet networks, such as Layer 2 bridged networks, that also handle other traffic with less stringent requirements. As a result of these developments, commodity Ethernet with, for example, Audio Video Bridging (AVB) is being introduced and used in industrial automation, professional audio processing and vehicular networking.

Another area in which the introduction of Layer 2 bridged networks is being considered is the fronthaul domain of mobile communication networks. The fronthaul domain connects a mobile operator's radio equipment(s) and radio equipment controller(s). This connection has technically challenging latency and Packet Delay Variation (PDV) requirements as defined, for example, by the Common Public Radio Interface (CPRI). In view of these requirements, the fronthaul domain is presently not provided by bridged networks but by dedicated lambda connections in optical networks. On the other hand, the benefits of sharing network resources by time critical traffic and other traffic would also be an interesting option for the fronthaul domain in case latency and PDV can be kept low.

One approach to reduce latency and PDV for time critical traffic is the classification of different traffic types such that time critical traffic can be transported in the communication network with a higher priority than other traffic. In the Ethernet standard, for example, eight traffic classes are defined to permit a prioritized handling of individual traffic classes.

Newer developments in the Ethernet standard permit the declaration of an arbitrary number of the eight traffic classes as express traffic class(es) that receive(s) particular treatment in an Ethernet bridge to selectively reduce packet delay for the associated traffic. For example, the IEEE standards 802.1Qbu "Frame Preemption" and 802.3br "Interspersing Express Traffic" suggest suspending transmission of less time critical ("preemptable") traffic to the benefit of time critical express traffic. The IEEE standard 802.1Qbv "Enhancements for Scheduled Traffic", on the other hand, targets at a packet delay reduction by draining transmission queues with respect to a well-defined timing, i.e., each network node (bridge) has to be aware of a common absolute time, e.g., by means of having time synchronization among them. All of these IEEE standards relate to the egress, or output, port of a network bridge.

The terms "egress" and "output" as well as "ingress" and "input", respectively, are used interchangeably herein. Also the terms "frame" and "packet" are used interchangeably herein.

It has been found that despite the various approaches to reduce delay and PDV in communication networks, an individual packet can still suffer from significant delay, and a packet flow from considerable PDV. As an example, the race of two simultaneously received express traffic packets of different packet flows for service at network element ports can result in a significant queuing delay for the packet losing the race as they share the same resources (namely the ones dedicated to express traffic). In addition to an increase of the overall packet delay, the losing packet flow additionally suffers from PDV accumulation as the losing packet flow in essence "inherits" the PDV of the winning packet flow. This situation is also referred to as fan-in.

The declaration of express traffic per se can therefore not guarantee a low delay and a low PDV for each and every express traffic packet flow. For example, frame preemption cannot help solving the race condition among time critical packet flows that all belong to the express traffic class. However, if racing situations for such packet flows cannot be controlled, then additional buffering is needed to reduce the PDV. On the other hand, such additional buffering will further increase the delay experienced by the buffered packets. Similar problems occur in other situations in which different packet flows of the same traffic handling class need to be processed in a communication network. IEEE 802.1Qbv defines approaches to reducing PDV based on controlling gates for different packet flows on a time base, which requires time synchronization. IEEE draft standard 802.1 Qci defines gates for ingress filtering and policing; however, these gates also require time synchronization. Time-based gating has to be programmed at each hop as accurate as possible and the exact arrival of packets needs to be known to this end. Applying tolerance time for packet arrival implies lost bandwidth and time synchronization inaccuracy may likewise reduce the efficiency of time-based gating or even render it inapplicable.

SUMMARY

There is a need for a packet processing technique that avoids one or more of the disadvantages of the prior art presented above, or other disadvantages.

According to a first aspect, a system comprising one or more network elements and configured to process at least first and second packet flows is provided. The system comprises a first packet gate selectively switchable between an open state for packet transmission and a closed state and an associated first packet queue. The first packet gate and the first packet queue are configured to handle first packet flow packets. The system further comprises a second packet queue configured to handle second packet flow packets. The system also comprises at least one processor configured to control switching of the first packet gate between the open state and the closed state based on the occurrence of a first event associated with the second queue to trigger transmission of the first packet flow packets in a relative transmission order among the first packet flow packets and the second packet flow packets.

The packet handling by the first packet queue may for instance comprise enqueuing first packet flow packets in and/or dequeuing first packet flow packets from the first packet guide. This also applies analogously for the packet handling by the second packet queue. The packet handling by the first packet gate may for instance comprise enabling in the open state of the first packet gate forwarding, e.g., towards an egress port, first packet flow packets, e.g., stored in the first packet queue, while preventing forwarding of first packet flow packets in the closed state.

Switching of the first packet gate between the open state and the closed state does not imply a specific switching order. It may thus comprise at least one of switching the first packet gate from the open state to the closed state or switching the first packet gate from the closed state to the open state.

Controlling switching of the first packet gate may for instance be performed by generating a control signal for switching of packet gate and providing the control signal to the packet gate. As the switching control is based on the occurrence of a first event rather than being time-controlled, the switching control may also be referred to as asynchronous switching control.

The relative transmission order may be applied locally at a single network element. The system presented herein may however comprise multiple network elements. In such a case, either some or all of the multiple network elements may apply the same relative transmission order for the first and second packet flow packets.

The one or more network elements may be located at any position in a communication network. As an example, the one or more network elements may be located at an edge of a transport network domain (e.g., at an edge towards upstream network elements sending the packets, such as the packet flow sources). In this case, the relative transmission order of the first and second packet flow packets into the transport network domain can be defined. The transport network domain, in turn, may include one or more core elements in charge of transferring the first and second packet flows within the transport network domain. The network elements presented herein may also take the form of such core elements.

The system may comprise a second packet gate selectively switchable between an open state for packet transmission and a closed state and associated with the second packet queue. Therein, the second packet gate is configured to handle second packet flow packets. Also the packet handling by the second packet gate may for instance comprise enabling in the open state of the second packet gate forwarding, e.g., towards an egress port, second packet flow packets, e.g., stored in the second packet queue, while preventing forwarding of second packet flow packets in the closed state. Switching of the second packet gate between the open state and the closed state does again not imply a specific switching order.

The second packet gate may be constantly in the open state. The presence of the second packet gate may in this case not affect second packet flow packet forwarding as packet forwarding may always be enabled by the second packet gate. The second packet gate being constantly in the open state may thus have the same effect as the absence of the second packet gate.

The system may comprise at least one processor configured to control switching of the second packet gate between the open state and the closed state. The processor configured to control switching of the second packet gate may or may not be the same processor as that configured to control switching of the first packet gate. In one implementation, the processor configured to control switching of the second packet gate between the open state and the closed state is configured to control switching of the second packet gate between the open state and the closed state based on the occurrence of a second event associated with the first queue.

The system may comprise at least one processor configured to select a predetermined number of second packet flow packets for transmission via the second packet gate in the open state of the second packet gate. The processor may or may not be the same processor as that configured to control switching of the second packet gate. Selecting the predetermined number of packets may comprise selecting those packets that are at the front of the second packet queue. Alternatively, it may comprise selecting specific packets for transmission irrespective of their position within the second packet queue. Selecting the predetermined number of packets may correspond to permitting the predetermined number of packets to be transmitted in the open state of the second packet gate, e.g., forwarded to another network element via an egress port. The predetermined number of packets may be equal to or greater than 1.

Likewise, the system may comprise at least one processor configured to select a predetermined number of first packet flow packets for transmission via the first packet gate in the open state of the first packet gate. The explanations provided above with respect to the selecting a predetermined number of second packet flow packets apply analogously.

The second packet flow may be a constant bitrate flow. Likewise, the first packet flow may also be a constant bitrate flow or may be a variable bitrate flow. In case of both the first packet flow and the second packet flow being constant bitrate flows, the period of the constant bitrate of both flows may be identical or may be different.

In one implementation, at least one of the first event and the second event may be a packet departure from the associated queue. A packet departure from a packet queue may for instance correspond to the dequeuing of a packet from the packet queue. A packet departure from a packet queue may be linked to the packet subsequently being transmitted, e.g., towards an egress port downstream the packet gate associated with the respective packet queue or towards another network element downstream the network element comprising the packet queue. In one variant of this implementation, the first event is the departure of the predetermined number of second packet flow packets selected for transmission from the second packet queue. Thus, the first event may occur when the predetermined number of packets has departed from the second packet queue.

At least one of the first event and the second event may be a packet arrival at the associated queue. A packet arrival at a packet queue may for instance correspond to enqueuing of a packet in the packet queue. A packet arrival at a packet queue may be linked to the packet previously being received at a network element comprising the respective packet queue, e.g., via an ingress port upstream the packet queue, and/or linked to the packet previously being forwarded towards the packet queue from an ingress port of such a network element.

At least one of the first event and the second event may be a packet—or a predetermined number of packets—bypassing the associated queue. For instance, bypassing a respective packet queue may comprise a respective packet arriving at a network element comprising that packet queue, e.g., at an ingress port thereof, or leaving an ingress port of such a network element and the packet then being directly forwarded towards the packet gate associated with the bypassed packet queue at an ingress or egress port. A respective packet queue may be bypassed by a packet arriving at a network element comprising that packet queue, for instance if the packet queue is empty and/or the arriving packet is selected for transmission/forwarding. When an arriving packet bypasses the respective packet queue, the arrival of the packet is directly linked to its departure. The event of bypassing a packet queue may thus be equated with both the packet arrival at the respective queue and the packet departure of the packet from the packet queue.

In one implementation, the at least one processor configured to control switching of the first packet gate between the open state and the closed state is configured to control switching of the first packet gate from the closed state to the open state based on the occurrence of a first event associated with the second queue. In one variant of this implementation, the at least one processor configured to control switching of the first packet gate between the open state and the closed state is further configured to control the first packet gate to periodically switch from the closed state to the open state. Accordingly, the first packet gate may periodically assume the open state even if the first event does not occur.

In one implementation, the at least one processor configured to control switching of the first packet gate between the open state and the closed state may be configured to control the first packet gate to switch from the open state to the closed state after a predetermined duration in the open state. In one variant of this implementation and when the second packet flow is a constant bitrate flow, the predetermined duration is based on a period of the constant bitrate of the second packet flow. The predetermined duration may be additionally based on a tolerance margin. The tolerance margin may for instance correspond to a packet delay variation regarding the arrival of packets of the second packet flow.

If the system comprises at least one processor configured to select at least one first packet flow packet for transmission via the first packet gate in the open state of the first packet gate, said processor may be configured to select at least one first packet flow packet only if a remaining duration of the predetermined duration is at least a transmission time required for transmitting the at least one first packet flow packet.

The packet flows processed in the system may comprise any kind of packets of any network layer. For instance, the packets may be Internet Protocol (IP) packets. As another example, the packet flows may constitute Ethernet layer traffic. Additionally, or in the alternative, one or more of the packet flows may constitute CPRI packet flows.

In a first implementation, the first packet gate, the first packet queue and the second packet queue form part of the same network element. If provided, a second packet gate associated with the second packet queue may likewise be from part of that network element. In one variant, the network element is the only network element of the system. In such a case the network element may constitute the system.

In one variant of the above implementation, the at least one processor configured to control switching of the first packet gate may form part of the same network element as the first packet gate, the first packet queue and the second packet queue. Also, if provided, at least one processor further configured to control switching of the second packet gate (if a second packet gate is provided) between the open state and the closed state may form part of that network element. Alternatively, the at least one processor configured to control switching of the first packet gate may be external to the network element comprising the first packet gate, the first packet queue and the second packet queue. In this case, the network element comprising the first packet gate may be equipped with an interface configured to receive a control signal configured to trigger switching of the first packet gate between the open state and the closed state. The control signal may for instance be provided by another element of the system, e.g., another network element. At least one further processor configured to control switching of the second packet gate may likewise be external a network element comprising the second packet gate. In this case, the network element comprising the second packet gate may be equipped with an interface configured to receive a control signal, e.g., provided by another element of the system, e.g., network element.

In a second implementation, the system comprises at least one first network element that comprises the first packet gate and the first packet queue and at least one second network element that comprises the second packet queue. The first network element may further comprise the at least one processor configured to control switching of the first packet gate. Alternatively, the at least one processor configured to control switching of the first packet gate may be external to the first network element. In this case, the first network element may be equipped with an interface configured to receive a control signal configured to control switching of the first packet gate between the open state and the closed state. The control signal may for instance be provided by another element of the system, e.g., another network element. If the second packet queue and the processor configured to control switching of the first packet gate are not provided within the same network element, the network element comprising the processor may be provided with an interface configured to receive first event information on the occurrence of the first event associated with the second packet queue, e.g., directly from the second network element or indirectly via another element such as a network controller, e.g., a network controller implemented as a controlling entity of a Software Defined Network (SDN). An interface configured to transmit first event information on the occurrence of the first event may be provided at the second network element.

If a second packet gate is provided, the second network element may further comprise the second packet gate. Optionally, if at least one processor configured to control switching of the second packet gate is provided, the second network element may also comprise said processor. Alternatively, said processor may be external to the second network element. In this case, the second network element may be equipped with an interface configured to receive a control signal configured to trigger switching of the second packet gate between the open state and the closed state. The control signal may for instance be provided by another element of the system, e.g., another network element. If the at least one processor configured to control switching of the second packet gate is configured to control switching of the second packet gate between the open state and the closed state based on the occurrence of a second event associated with the first queue but the first queue and the processor are not provided within the same network element, the network element comprising the processor may be provided with an interface configured to receive second event information on the occurrence of the second event associated with the first packet queue, e.g., directly from the first network element or indirectly via another element such as a network controller, e.g., a network controller implemented as a controlling entity of an SDN. An interface configured to transmit information on the occurrence of the second event may be provided at the first network element.

The system may comprise a first port associated with the first packet queue and configured to handle first packet flow packets and a second port associated with the second packet queue and configured to handle second packet flow packets. The packet handling by a particular port may in particular comprise receiving and/or transmitting one or more packets. Each of the first port and the second port may be configured as one of an ingress port and an egress port. An ingress port may be arranged upstream an associated packet queue. A packet transmitted via an ingress port may be forwarded to and received by an egress port (e.g., of the same network element). A packet transmitted from an egress port may be sent towards and received by an ingress port of another network element. The first port and the first packet queue may be provided in the same network element. Likewise, the second port and the second packet queue may be provided in the same network element.

The system may comprise an interface configured to receive, from a network controller, transmission order information defining the relative transmission order among the first packet flow packets and the second packet flow packets. The interface may for instance be provided at a network element comprising the at least one processor configured to control switching of the first packet gate.

The first packet flow and the second packet flow may be of the same traffic handling class, e.g., a traffic class as defined in the Ethernet standard, or of different traffic handling classes.

According to a second aspect, a network controller configured to control processing of at least first and second packet flows by a system having a first packet gate selectively switchable between an open state for packet transmission and a closed state and an associated first packet queue, the first packet gate and the first packet queue configured to handle first packet flow packets, and a second packet queue configured to handle second packet flow packets is provided. The network controller comprises at least one processor configured to determine transmission order information defining a relative transmission order among the first packet flow packets and the second packet flow packets. The network controller further comprises an interface configured to send the transmission order information to the system. Therein, the transmission order information is configured to cause switching of the first packet gate between the open state and the closed state based on the occurrence of a first event associated with the second packet queue to trigger transmission of the first packet flow packets and the second packet flow packets in the relative transmission order.

Sending the transmission order information to the system may for instance be triggered by a control signal provided by the processor configured to determine the transmission order information or by another processor. Sending the transmission order information to the system may for instance comprise sending the transmission order information to a network element forming part of the system that comprises a processor configured to control switching of the first packet gate between the open state and the closed state. The network element may comprise a corresponding interface configured to receive the transmission order information.

The network controller may comprise an interface configured to send first event information on the occurrence of the first event associated with the second packet queue to the system. Sending the first event information to the system may for instance comprise sending the first event information to a network element forming part of the system that comprises a processor configured to control switching of the first packet gate between the open state and the closed state. The network element may comprise a corresponding interface configured to receive the first event information. The network controller itself may comprise an interface configured to receive the first event information, e.g., from a network element comprising the second packet queue. The network controller may thus be configured to act as a relay for forwarding the first event information.

The system may comprise a second packet gate selectively switchable between an open state for packet transmission and a closed state and associated with the second packet queue, the second packet gate configured to handle second packet flow packets, and the transmission order information may be configured to cause switching of the second packet gate between the open state and the closed state.

In one implementation, switching of the second packet gated may be based on the occurrence of a second event associated with the first packet queue. In one variant of this implementation, the network controller comprises an interface configured to send second event information on the occurrence of the second event associated with the first packet queue to the system. Sending the second event information to the system may for instance comprise sending the second event information to a network element forming part of the system that comprises a processor configured to control switching of the second packet gate between the open state and the closed state. The network element may comprise a corresponding interface configured to receive the second event information. The network controller itself may comprise an interface configured to receive the second event information, e.g., from a network element comprising the first packet queue. The network controller may thus be configured to act as a relay for forwarding the second event information.

The network controller may be configured to send the transmission order information to multiple network elements in the system to define the same packet order throughout a communication network. To this end, the processor configured to determine the transmission order information or another processor may for instance be configured to control the interface configured to send the transmission order information to the system accordingly.

The network controller may be implemented as controlling entity of an SDN. In general, the network controller may be configured to perform the steps of any of the methods and method aspects presented herein as far as the network controller is concerned.

A third aspect is directed to a communication network comprising the system according to the first aspect and the controller according to the second aspect of the present disclosure. The system may be comprised by or interface a fronthaul network domain.

According to a fourth aspect, a method of operating a system comprising one or more network elements and configured to process at least first and second packet flows, the system having a first packet gate selectively switchable between an open state for packet transmission and a closed state and an associated first packet queue, the first packet gate and the first packet queue configured to handle first packet flow packets, and a second packet queue configured to handle second packet flow packets, is provided. The method comprises controlling switching of the first packet gate between the open state and the closed state based on the occurrence of a first event associated with the second packet queue to trigger transmission of the first packet flow packets in a relative transmission order among the first packet flow packets and the second packet flow packets.

According to a fifth aspect, a method of operating a network controller configured to control processing of at least first and second packet flows by a system having a first packet gate selectively switchable between an open state for packet transmission and a closed state and an associated first packet queue, the first packet gate and the first packet queue configured to handle first packet flow packets, and a second packet queue configured to handle second packet flow packets, is provided. The method comprises determining transmission order information defining a relative transmission order among the first packet flow packets and the second packet flow packets. The method further comprises sending the transmission order information to the system. Therein, the transmission order information is configured to cause switching of the first packet gate between the open state and the closed state based on the occurrence of a first event associated with the second packet queue to trigger transmission of the first packet flow packets and the second packet flow packets in the relative transmission order.

According to a sixth aspect generalizing the system according to the first aspect, a system comprising one or more network elements and configured to process at least first and second packet flows is provided. The system comprises a first packet gate selectively switchable between an open state for packet transmission and a closed state and an associated first packet processing element, e.g., a first packet queue or a first stream filter. The first packet gate and the first packet processing element are configured to handle first packet flow packets. The system further comprises a second packet processing element, e.g., a second packet queue or a second stream filter, configured to handle second packet flow packets. The system also comprises at least one processor configured to control switching of the first packet gate between the open state and the closed state based on the occurrence of a first event associated with the second packet processing element to trigger transmission of the first packet flow packets in a relative transmission order among the first packet flow packets and the second packet flow packets.

The system according to the sixth aspect may comprise a second packet gate selectively switchable between an open state for packet transmission and a closed state and associated with the second packet processing element. Therein, the second packet gate is configured to handle second packet flow packets.

In one implementation, at least one of the first packet processing element and the second packet processing element is stream filter. In one variant of this implementation, the first packet processing element is a first stream filter and the second packet processing element is a second stream filter. In one variant, the at least one processor configured to control switching of the one or more packet gates between the open state and the closed state is configured to control switching of the given packet gates from the closed state to the open state based on the occurrence of an event associated with a stream filter The packet handling by the first stream filter may for instance result in a packet passing or failing the specified filter, wherein packets that fail a filter may be discarded. The filter specification can include other actions, e.g., setting one or more parameters in the packet header. This also applies analogously for the packet handling by the second stream filter. At least one of the first event and the second event may be examining and/or manipulating a packet by a respective stream filter.

According to a seventh aspect generalizing the network controller according to the second aspect, a network controller configured to control processing of at least first and second packet flows by a system having a first packet gate selectively switchable between an open state for packet transmission and a closed state and an associated first packet processing element, e.g., a first packet queue or a first stream filter, the first packet gate and the first packet processing element configured to handle first packet flow packets, and a second packet processing element e.g., a second packet queue or a second stream filter, configured to handle second packet flow packets, is provided. The network controller comprises at least one processor configured to determine transmission order information defining a relative transmission order among the first packet flow packets and the second packet flow packets and an interface configured to send the transmission order information to the system. Therein, the transmission order information is configured to cause switching of the first packet gate between the open state and the closed state based on the occurrence of a first event associated with the second packet processing element to trigger transmission of the first packet flow packets and the second packet flow packets in the relative transmission order.

A eighth aspect is directed to a communication network comprising the system according to the sixth aspect and the controller according to the seventh aspect of the present disclosure.

A ninth aspect is directed to a method generalizing the method according to the fourth aspect. The method is a method of operating a system comprising one or more network elements and configured to process at least first and second packet flows, the system having a first packet gate selectively switchable between an open state for packet transmission and a closed state and an associated first packet processing element, e.g., a first packet queue or a first stream filter, the first packet gate and the first packet processing element configured to handle first packet flow packets, and a second packet processing element, e.g., a second packet queue or a second stream filter, configured to handle second packet flow packets, is provided. The method comprises controlling switching of the first packet gate between the open state and the closed state based on the occurrence of a first event associated with the second packet processing element to trigger transmission of the first packet flow packets in a relative transmission order among the first packet flow packets and the second packet flow packets.

A tenth aspect is directed to a method generalizing the method according to the fifth aspect. The method is a method of operating a network controller configured to control processing of at least first and second packet flows by a system having a first packet gate selectively switchable between an open state for packet transmission and a closed state and an associated first packet processing element, e.g., a first packet queue or a first stream filter, the first packet gate and the first packet processing element configured to handle first packet flow packets, and a second packet processing element, e.g., a second packet queue or a second stream filter, configured to handle second packet flow packets, is provided. The method comprises determining transmission order information defining a relative transmission order among the first packet flow packets and the second packet flow packets. The method further comprises sending the transmission order information to the system. Therein, the transmission order information is configured to cause switching of the first packet gate between the open state and the closed state based on the occurrence of a first event associated with the second packet processing element to trigger transmission of the first packet flow packets and the second packet flow packets in the relative transmission order.

According to an eleventh aspect, a computer program product is provided. It comprises program code portions for performing the methods and method steps presented herein when the computer program product is executed by one or more processors. The one or more processors may be located on an individual network node or may be comprised by a distributed computing system. The computer program product may be stored on a computer-readable recording medium such as a semiconductor memory, DVD-ROM, CD-ROM, and so on. The computer program product may also be provided for download via a communication connection.

BRIEF DESCRIPTION OF THE DRAWINGS

In the following, embodiments and exemplary aspects of the present disclosure will be described in more detail with reference to the drawings, in which.

DETAILED DESCRIPTION

In the following description, for purposes of explanation and not limitation, specific details are set forth, such as particular network protocols and particular network elements, in order to provide a thorough understanding of the present disclosure. It will be apparent to one skilled in the art that the present disclosure may be practiced in other embodiments that depart from these particular details.

Those skilled in the art will further appreciate that the functions, steps and services described herein may be implemented using individual hardware circuitry, using software functioning in conjunction with a programmed processor or general purpose computer, using an Application Specific Integrated Circuit (ASIC), and/or using one or more Digital Signal Processors (DSPs). It will also be appreciated that while the present disclosure is primarily described in the context of methods and devices, it may also be embodied in one or more processors and one or more memories coupled to the one or more processors, wherein the one or more memories are encoded with one or more programs that, when executed on the one or more processors, perform the functions, steps and services disclosed herein.

In the following description, explanations given with respect to one aspect of the present disclosure correspondingly apply to the other aspects.

Figure 1A:
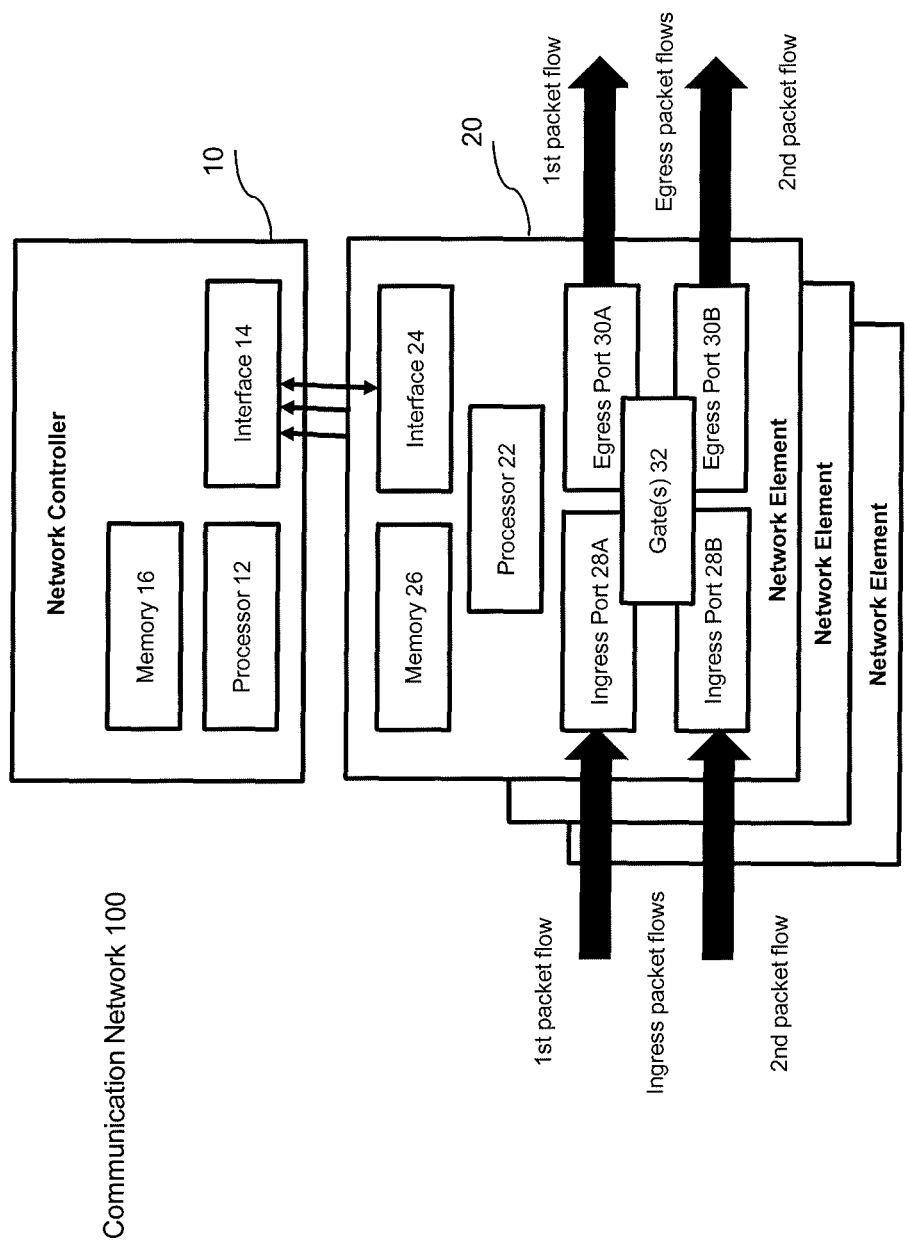
FIG. 1A illustrates an embodiment of a communication network with a network controller embodiment and one or more network element embodiments in accordance with the present disclosure.

FIG. 1A illustrates an embodiment of some components of a communication network 100. As illustrated in FIG. 1A, the communication network 100 comprises a network controller 10 as well as one or more network elements 20 in communication with the network controller 10. It will be appreciated that the communication network 100 comprises additional components not illustrated in FIG. 1A.

The network controller 10 of FIG. 1A is configured to control packet processing by the one or more network elements 20. To this end, the network controller 10 comprises a processor 12 and an interface 14 configured to communicate with the one or more network elements 20. The network controller 10 further comprises a memory 16 with program code that, when executed by the processor 12, configures the network controller 10 to implement the methods and method aspects of the present disclosure as far as the network controller is concerned.

In a similar manner, each network element 20 comprises a processor 22, an interface 24 and a memory 26. The interface 24 is configured for communication with the network controller 10. The memory 26 stores program code that, when executed by the processor 22, configures the network element 20 to implement the methods and method aspects of the present disclosure as far as the network element is concerned.

The processor 22 is configured to control packet ingress and egress processing operations. These processing operations may, for example, comprise Layer 2 processing. In some variants, the network element 20 may thus be configured as a Layer 2 Ethernet bridge or switch within the communication network 100.

As illustrated in FIG. 1A, the network element 20 further comprises one or more ingress ports 28A, 28B as well as one or more egress ports 30A, 30B. Each ingress port 28A, 28B is configured to handle one or more ingress packet flows, and each egress port 30A, 30B is configured to handle one or more egress packet flows. Ingress port packet handling may comprise receiving packets and forwarding the packets (after one or more optional ingress processing operations) to an egress port 30A, 30B. Egress port packet handling may comprise receiving packets from an ingress port 28A, 28B and transmitting the packets (after one or more optional egress processing operations) towards another component in the communication network 100. To each individual ingress port 28A, 28B and to each individual egress port 30A, 30B one or more ingress and egress packet flows, respectively, may be allocated.

Each network element 20 further comprises one or more packet gates 32. Each packet gate 32 is associated with a dedicated ingress port 28A, 28B or a dedicated egress port 30A, 30B. In certain variants, one packet gate 32 is provided for each ingress port 28A, 28B, and no packet gate 32 is provided for any egress port 30A, 30B. In other variants, only the egress ports 30A, 30B are provided with packet gates 32. Both variants can be considered as needed.

Each packet gate 32 is selectively switchable between an open state for packet transmission and a closed state. In the open state of an ingress port packet gate 32, packets can be forwarded from a respective ingress port 28A, 28B to a respective egress port 30A, 30B. In the open state of an egress port packet gate 32, packets can be transmitted by a respective egress port 30A, 30B to one or more downstream network elements 20.

Figure 1B:
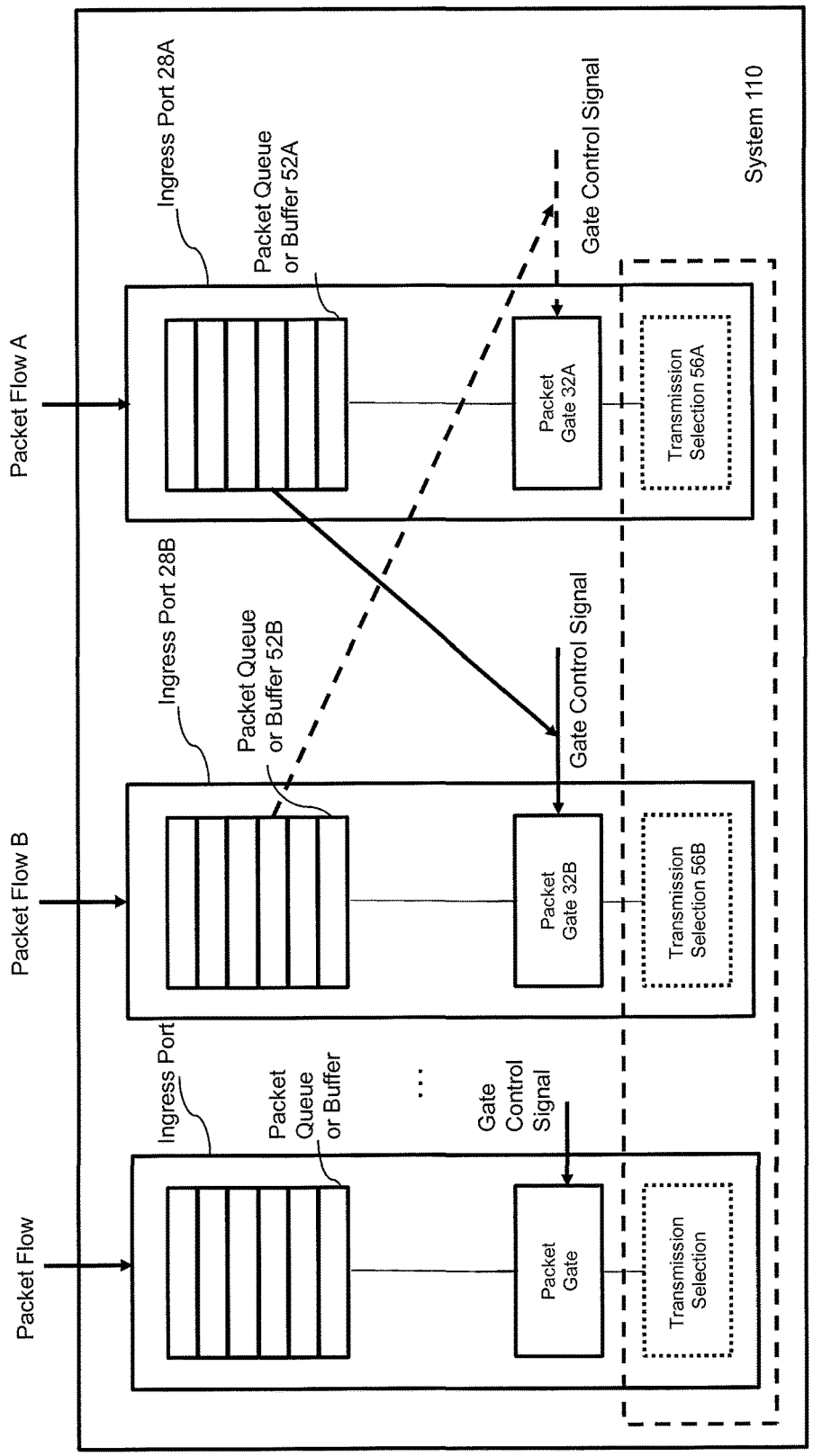
FIG. 1B illustrates a first embodiment of a system comprising packet gates and packet queues in accordance with the present disclosure.

FIG. 1B illustrates in more detail a first embodiment of a system 110 comprising a first packet gate 32A as part of a first ingress port 28A as well as a second packet gate 32B as part of a second ingress port 28B. The first ingress port 28A and the second ingress port 28B may belong to a single network element 20 (as illustrated in FIG. 1A) or to two different network elements 20 (each configured as shown for one exemplary network element 20 in FIG. 1A). Of course, the ingress port configuration of FIG. 1B is equally applicable to an egress port 30A, 30B (not shown in FIG. 1B)

As further illustrated in FIG. 1B, each ingress port 28A, 28B comprises a packet queue or packet buffer 52A, 52B for temporarily storing incoming packets of one or more dedicated ingress packet flows. Such an allocation may be performed by the network controller 10 or any other network component. As an alternative to dedicated ingress packet flows, the packets of different packet flows may be received at an individual ingress port 28A, 28B encapsulated in a single data transport entity (such as a higher-level packet) and may need to be decapsulated prior to any further processing. Alternatively, or in addition, the packets of different packet flows arriving at the same ingress port 28A, 28B may be identified by a common identifier, such as a common ingress port identifier or Virtual Local Area Network (VLAN) Identifier (VID). If packets of different packet flows arrive at the same ingress port, a filter configured to separate the different packet flows and distribute each packet flow to its corresponding packet queue may be provided.

In FIG. 1B, packet flow A is allocated to packet queue 52A and packet flow B is allocated to packet queue 52B. Packet flows A and B may be packet flows of different traffic handling classes. For instance, packet flow A may be a packet flow of class #0, and packet flow B may be a packet flow of class #1. The packet queues 52A, 52B do not necessarily have to be associated with corresponding ports such as ingress ports 28A and 28B. For instance, they may likewise be provided separately from corresponding ports and packet flows A and B may be allocated directly to a respective packet queue 52A, 52B.

In FIG. 1B, further ingress port components include per ingress port 28A, 28B an optional transmission selection function 56A, 56B. In certain variants, the transmission selection functions 56A, 56B are operated by the processor 22, or the processor of any other network element 20. In case the ingress ports 28A, 28B belong to a single network element 20, the transmission selection functions 56A and 56B may be realized in the form of a single function (as illustrated by dashed lines in FIG. 1B). As represented by the ingress port at the left side of FIG. 1B, at least one further ingress ports having a respective allocated packet flow may be provided in addition to ingress ports 28A, 28B. However, in the following focus is put on ingress ports 28A and 28B for the sake of simplicity.

The operation of each packet gate 32A, 32B in the exemplary scenario of FIG. 1B is to enable forwarding packets of the respective packet flow from the respective packet queue 52A, 52B towards an associated egress port 30A, 30B (see FIG. 1A) in the open state, while preventing forwarding in the closed state. To this end, each packet gate 32A, 32B may connect or disconnect the respective packet queue 52A, 52B from the associated transmission selection function 56A, 56B.

The state of the packet gate 32B is controlled by a gate control signal, i.e., it is switched between the open state and the closed state according to the control signal. The gate control signal is generated by the processor 22. The processor 22 is configured to control switching of the packet gate 32B between the open state and the closed state based on the occurrence of a first event associated with the packet queue 52A to trigger transmission of the packets of packet flow A in a relative transmission order among the packets of packet flow A and the packets of packet flow B. Thus, in the scenario of FIG. 1B, the control signal for the packet gate 32B is configured to control switching of the packet gate 32B accordingly. The influence of an event associated with the packet queue 52A on the gate control signal for the packet gate 32B is symbolized by the arrow extending from the packet queue 52A to the arrow representing the gate control signal for packet gate 32B.

In one implementation, also the state of packet gate 32A is controlled by a gate control signal. The gate control signal may likewise be generated by the processor 22 or by another processor. It will be understood that in case of a first network element 20 comprising the packet gate 32B and the processor 22 and a second network element 20 comprising the packet gate 32A, said second gate may have a corresponding second processor. In one variant of the implementation comprising packet gate 32A being controlled by a gate control signal, the respective processor is configured to control switching of packet gate 32A between the open state and the closed state based on the occurrence of a second event associated with the packet queue 52B. The potential influence of an event associated with the packet queue 52B on the gate control signal for packet gate 32A is symbolized by the dashed arrow extending from the packet queue 52B to the arrow representing the gate control signal for packet gate 32A. In another implementation, the packet gate 32A may be constantly in the open state. In one variant of this implementation, the packet gate 32A thus does not have to be provided with a gate control signal. In FIG. 1B, the arrow indicating provision of a gate control signal to the packet gate 32A is thus likewise dashed. In still another implementation, the packet gate 32A may not be provided. For instance, in this case there may a direct connection between the packet queue 52A and the transmission selection 56A.

As switching control is based on an event rather than being time-controlled, the switching control may also be referred to as an asynchronous switching control. Thus, the processor 22 is configured to control switching of packet gate 32A/32B between the open state and the closed state in an asynchronous manner based on the occurrence of an event associated with the packet queue 52B/52A to trigger transmission of the packets of packet flow A/B in a relative transmission order among the packets of packet flow A and the packets of packet flow B.

A processor controlling a switching of a packet gate 32A, 32B may be provided at another network element 20 than the respective packet gate. In such a scenario, a network element 20 comprising the processor may be provided with an interface, e.g., the interface 24, configured to send the gate control signal to the network element 20 comprising the respective packet gate, which may in turn comprise an interface configured to receive the gate control signal.

Returning to FIG. 1A, the network controller 10, specifically its processor 12, may be configured to determine transmission order information defining a relative transmission order among the packets of packet flow A and the packets of packet flow B (see FIG. 1B). The transmission order information may be sent to a single, several or all network elements 20 within the communication network 10 via the network controller's interface 14. The network elements 20 may receive the transmission order information via their interface 24. For instance, a network element 20 comprising packet gate 32B (see FIG. 1B) may then control switching of the packet gate 32B between the open state and the closed state based on the occurrence of a first event associated with the packet queue 52A to trigger transmission of the packets of packet flow A in the relative transmission order among the packets of packet flow A and the packets of packet flow B defined by the transmission order information. By sending the transmission order information to multiple network elements 20 in the communication network 100, the same transmission order may be defined throughout the communication network 100.

The network controller 10 may serve as a relay for event information associated with a packet queue such as packet queues 52A, 52B of FIG. 1B. For instance, a network element 20 comprising packet queue 52A and a network element 20 comprising a processor 22 that is configured to control switching of the packet gate 32B between the open state and the closed state based on the occurrence of an event associated with the packet queue 52A may be separate entities. The network element 20 comprising packet queue 52A may forward event information associated with the packet queue 52A to the network controller 10 via its interface 24. The network controller 10 may receive the first event information via its interface 14 and forward, again via interface 14, the first event information to a network element 20 comprising the processor 22 that is configured to control switching of the packet gate 32B. There, the first event information may be received via the interface 24. In a similar manner, network controller 10 may act as a relay for event information on the occurrence of an event associated with the packet queue 52B.

Figure 1C:
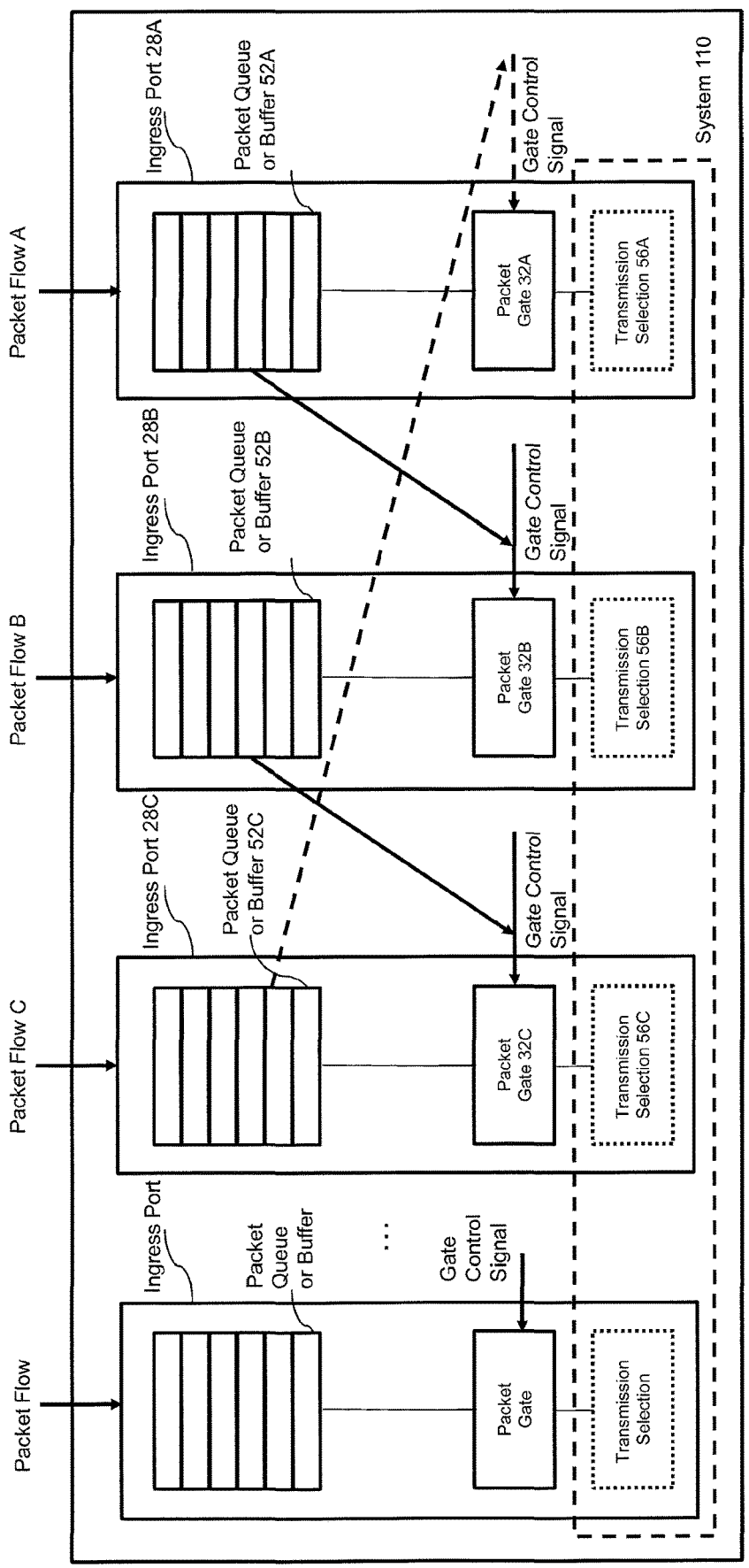
FIG. 1C illustrates a second embodiment of a system comprising packet gates and packet queues in accordance with the present disclosure.

FIG. 1C illustrates a second embodiment of a system 110 comprising packet gates and packet queues in accordance with the present disclosure, the system exhibiting some similarities to that of FIG. 1B. Accordingly, focus is put on the differences of the system 110 of FIG. 1C compared to the system of FIG. 1B.

The system 110 of FIG. 1C comprises a third ingress port 28C. Similar to the scenario of FIG. 1B, the first ingress port 28A, the second ingress port 28B and the third ingress port 28C may belong to a single network element 20 (as illustrated in FIG. 1A) or to two different network elements 20 (each configured as shown for one exemplary network element 20 in FIG. 1A).

A third packet flow C is allocated to the packet queue 52C. Packet flow C may be a packet flow of a different traffic handling class or the same traffic class as packet flows A or B, which may be an express class. In the presently explained scenario, packet flows A and B may be constant bitrate flows. Packet flow C may also be a constant bitrate flow or may be a variable bitrate flow. Put more generally, if a number N of packet flows is provided, wherein at least N−1 of the packet flows are packet flows of the same traffic handling class, the N−1 packet flows of the same traffic handling class may be constant bitrate packet flows and 1 packet flow, which may or may not have the same traffic handling class as the other N−1 packet flows, may be a variable bitrate packet flow.

Optionally, the ingress port 28C may comprise a transmission selection function 56C. In certain variants, the transmission selection functions 56A, 56B, 56C are operated by the processor 22 of a network element 20 including at least one of ingress ports 28A, 28B and 28C, e.g., all of these ingress ports, or the processor 22 of any other network element 20. In case the ingress ports 28A, 28B, 28C belong to a single network element 20, the transmission selection functions 56A, 56B and 56C may be realized in in the form of a single function (as illustrated by dashed lines in FIG. 1C). The operation of each packet gate 32A, 32B, 32C, similarly to the case of FIG. 1B, in the exemplary scenario of FIG. 1C is to enable forwarding packets of the respective packet flow from the respective packet queue 52A, 52B, 52C towards an associated egress ports.

The state of the packet gate 32C is controlled by a gate control signal, i.e., it is switched between the open state and the closed state according to the control signal. The gate control signal is generated by a processor 22. The processor 22 is configured to control switching of the packet gate 32C between the open state and the closed state based on the occurrence of an event associated with the packet queue 52B to trigger transmission of the packets of packet flow C in a relative transmission order among the packets of packet flow B and the packets of packet flow C. Thus, in the scenario of FIG. 1C, the control signal for the packet gate 32C is configured to control switching of the packet gate 32C accordingly. The influence of an event associated with the packet queue 52B on the gate control signal for the packet gate 32C is symbolized by the arrow extending from the packet queue 52B to the arrow representing the gate control signal for packet gate 32C.

As in the scenario of FIG. 1B, a processor 22, which may for instance be the same processor as that controlling switching of the packet gate 32C, is configured to control switching of the packet gate 32B between the open state and the closed state based on the occurrence of an event associated with the packet queue 52A to trigger transmission of the packets of packet flow A in a relative transmission order among the packets of packet flow A and the packets of packet flow B. In one implementation comprising also packet gate 32A being controlled by a gate control signal, a respective processor is configured to control switching of packet gate 32A between the open state and the closed state based on the occurrence of an event associated with the packet queue 52C (represented by the dashed arrow from the packet queue 52C to the arrow representing the gate control signal for packet gate 32A). In another implementation, just like on FIG. 1B, the packet gate 32A may be constantly in the open state.

It will be appreciated that also more than three packet flows may be distinguished. In the already mentioned scenario with N packet flows being provided, at least N−1 packet gates, each of which is configured to handle a respective one of the N−1 packet flows, may be controlled in accordance with a technique as disclosed herein to trigger transmission of packets of N−1 packet flows in a relative transmission order among the packets of the N packet flow, thus establishing a desired relative transmission order among the N packet flow packets.

For the sake of simplicity, in the further course of this disclosure focus is put on a scenario such as that of FIG. 1B, where two packet flows A and B are the center of attention and at least one packet gate is controlled in accordance with a technique as disclosed herein, not on a scenario wherein N>2 specific packet flows are distinguished (e.g., N=3 in FIG. 1C) and at least N−1 packet gates are controlled in accordance with a technique as disclosed herein. However, the following disclosure also applies analogously to such a scenario with N>2.

Figure 1D:
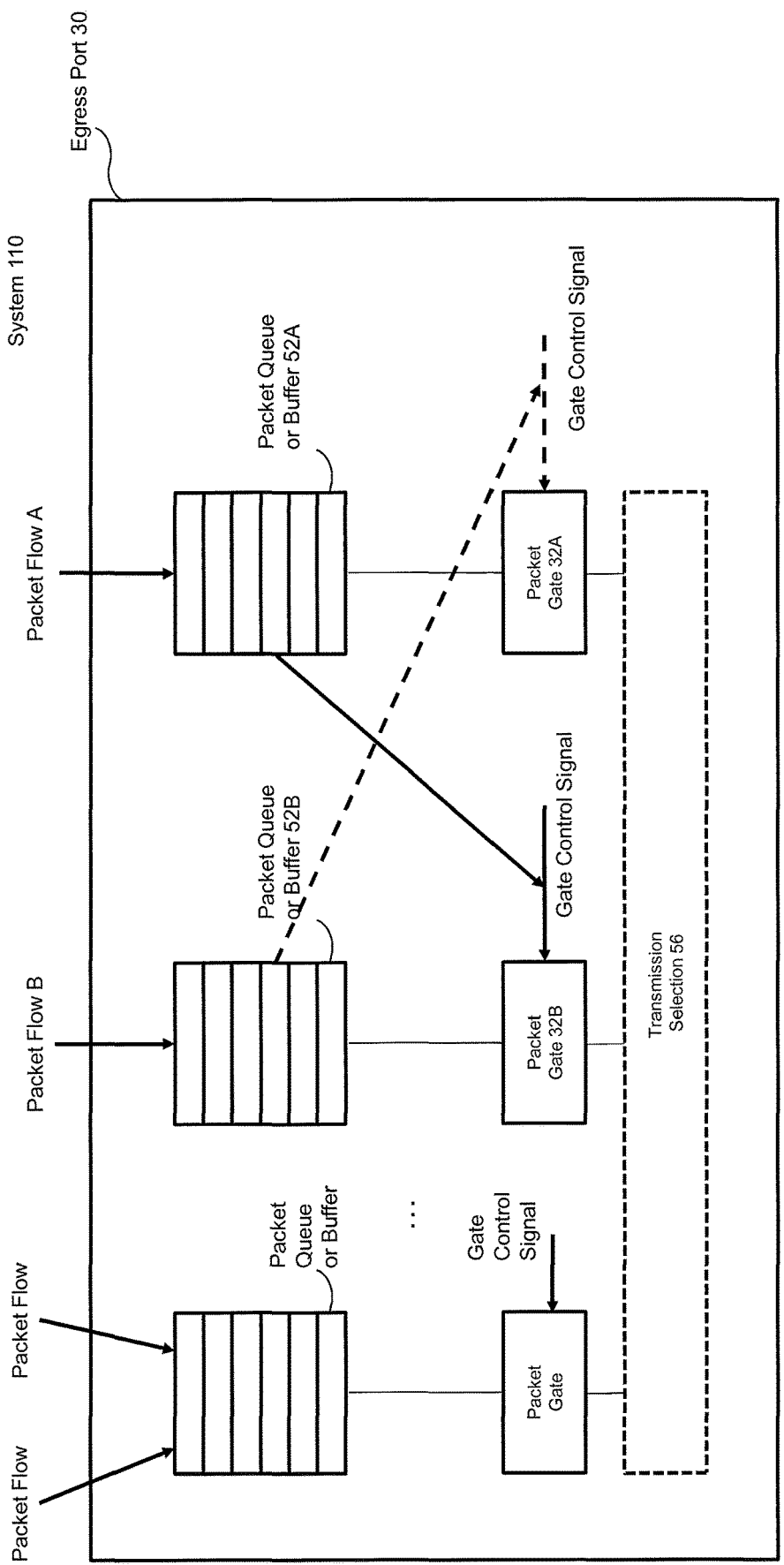
FIG. 1D illustrates a third further embodiment of a system comprising packet gates and packet queues in accordance with the present disclosure.

FIG. 1D illustrates a third embodiment of a system 110 comprising packet gates 32A, 32B and packet queues 52A, 52B in accordance with the present disclosure. The system 110 of FIG. 1D comprises an egress port, which may, for instance, be the egress port 30A of the network element 20 as illustrated in FIG. 1A.

Similar to the ingress ports of the systems of FIGS. 1B and 1C, the egress port 30A of the system 110 of FIG. 1D comprises a packet queue 52A having an associated packet gate 32A and a packet queue 52B having an associated packet gate 32B. Again, as shown at the left side of FIG. 1D, at least one further packet queue having an associated packet gate may be provided in addition to the packet queues 52A, 52B and the packet gates 32A, 32B. For instance, at least eight packet queues with associated packet gates may be provided, wherein each of the at least eight packet queues correspond to a specific one of the eight priority classes available in the VLAN tags. However, in the following focus is put on the packet queues 52A, 52B and the packet gates 32A, 32B for the sake of simplicity.

In FIG. 1D, packet flow A is allocated to packet queue 52A and packet flow B is allocated to packet queue 52B. In the present example, packet flows A and B are packet flows of an express traffic class. Packets of the packet flows A and B may be distinguished based on a VID, for instance, and assigned to their respective packet queues. In general, and as shown at the left side of FIG. 1D, more than only a single packet flow may be assigned to a packet queue. This also applies to the packet queues 52A and 52B. However, for simplicity only packet flows A and B are considered at the packet queues 52A and 52B.

Similar to FIG. 1B and FIG. 1C, also in FIG. 1D at least the state of the packet gate 32B is controlled by a gate control signal, i.e., it is switched between the open state and the closed state according to the control signal, the gate control signal being generated by a processor configured to control switching of the packet gate 32B between the open state and the closed state based on the occurrence of an event associated with the packet queue 52A to trigger transmission of the packets of packet flow B in a relative transmission order among the packets of packet flow A and the packets of packet flow B.

If no measures have been taken before, e.g., at an ingress port, packets of different packet flows having the same traffic class, e.g., belonging to the express traffic class, and destined to the same egress port would generally race (also referred to as fan-in) for being selected at the transmission selection function 56 of the egress port 30A. However, as the packets of packet flows A and B are fed to dedicated packet queues at the egress port 30A, e.g., based on distinguishing them using a respective VLAN tag, and the state of the packet gate 32B is controlled based on the occurrence of an event associated with the packet queue 52A, a relative transmission order among the packets of packet flow A and the packets of packet flow B may be established. Accordingly, packets of the packet flows A and B arrive at the transmission selection function 56 in a desired order and racing is avoided. The packets may then be forwarded by transmission selection function 56 in that order. Accordingly, in the example of FIG. 1D, a controllable packet gate may not be needed at an ingress port corresponding to the egress port 30A for establishing a desired relative transmission order for packets leaving the network element 20 comprising the egress port 30A. A packet queue may neither be required at such an ingress port or it may only serve for storing packets if forwarding to an egress port is temporarily impossible for some reason other than a closed packet gate.

Figure 1E:
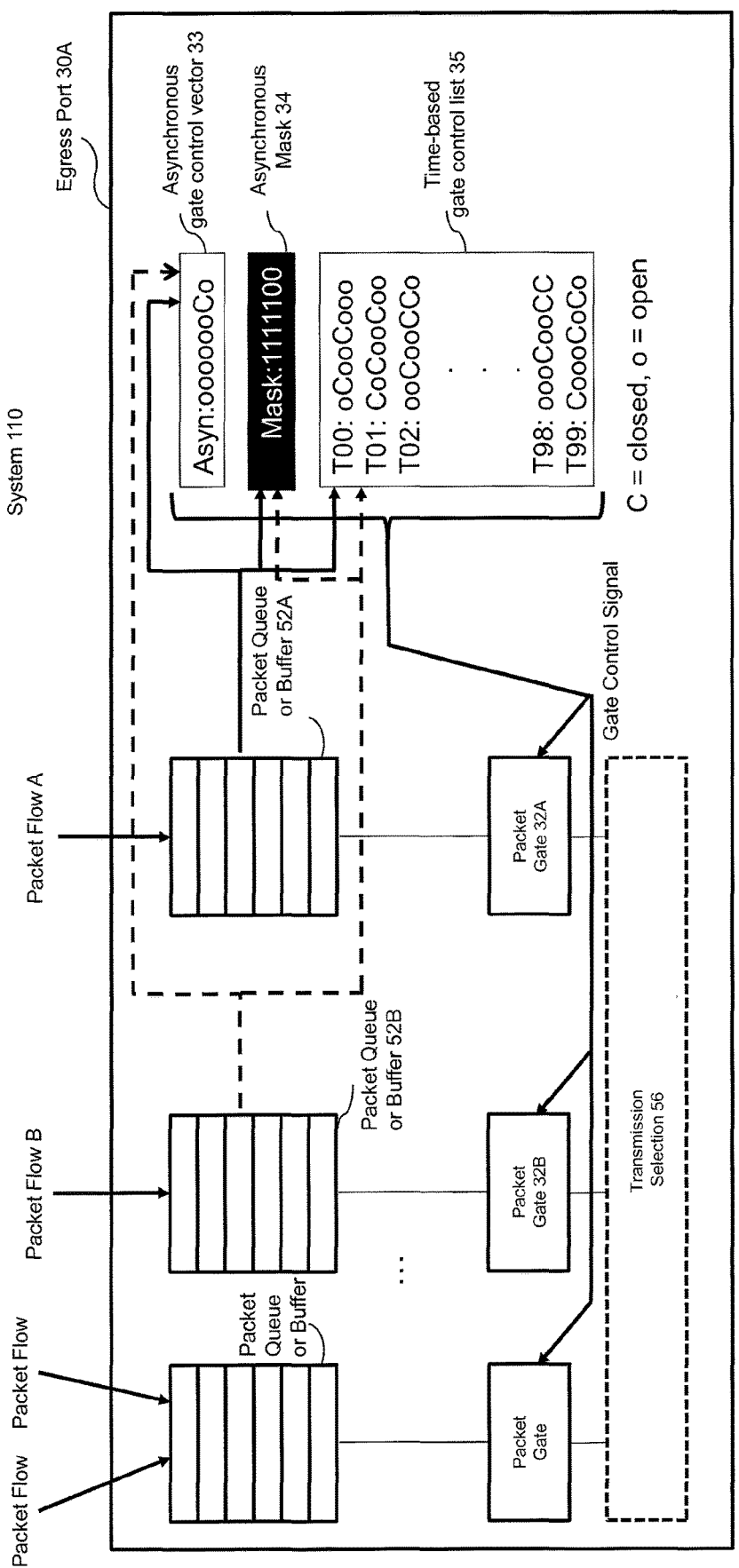
FIG. 1E illustrates a fourth embodiment of a system comprising packet gates and packet queues in accordance with the present disclosure.

FIG. 1E illustrates a fourth embodiment of a system 110 comprising packet gates 32A, 32B and packet queues 52A, 52B in accordance with the present disclosure. The system 110 comprises an egress port, which may, for instance, be the egress port 30A of the network element 20 as illustrated in FIG. 1A. The system 110 of FIG. 1E exhibits some similarities to that of FIG. 1D and focus is put on the differences of the system 110 of FIG. 1E as compared to the system of FIG. 1D.

As a main difference to the system of FIG. 1D, in the system 110 of FIG. 1E, controlling switching of a packet gate 32 based on the occurrence of an event i.e., asynchronous packet gate switching control, is implemented in the environment of a system allowing time-based, i.e., synchronous, packet gate switching control. Thus, in the system 110 of FIG. 1E, asynchronous and synchronous packet gate switching control may be combined. To this end, in addition to a time-based gate control list 35 that is similar to a known time-based gate control list for synchronous packet gate switching but used differently, an asynchronous gate control vector 33 and a mask 34 are provided.

In the example of FIG. 1E, the time-based gate control list 35 defines, for each of the points in time of a time pattern (time points T00 to T99 in the figure), the state of each packet gate 32 of the egress port 30A, i.e., whether the respective packet gate 32 is open or closed. The time-based gate control list 35 may for instance be similar or identical to a gate control list as known from IEEE standard 802.1Qbv or IEEE draft standard 802.1 Qci, which apply a time synchronization method in the network in order to provide synchronous time for network nodes, which time is used as the basis for the gate control list.

The mask 34 may be a list comprising a binary value for each of the packet gates 32. In the present example, the value "1" defines that a respective associated packet gate 32 is to be switched in a synchronous manner, i.e., switched according the time-based gate control list 35. Accordingly, the value "0" defines that a respective associated packet gate 32 is to be switched in an asynchronous manner, i.e., switched in accordance with the asynchronous gate control vector 33. Put differently, the mask 34 defines which of the gate control vector 33 and the time-based gate control list 35 determines switching control for the packet gates 32 of the egress port 30A. If the value "1" defines that a respective associated packet gate 32 is to be switched in a synchronous manner and the value "0" defines that a respective associated packet gate 32 is to be switched in an asynchronous manner, the mask 34 may be used via a logical AND operation, i.e., the value "0" may override/invalidate the corresponding value(s) in the time-based gate-control list 35 and thus activate the asynchronous gate control vector 33, while the mask value "1" does not affect the corresponding value(s) in the time-based gate-control list 35. It will be appreciated, however, that the values comprised by the mask 34 and defining the manner in which a packet gate 32 is switched may be chosen differently, e.g., "0" may stand for synchronous switching and "1" may stand for asynchronous switching.

In the example of FIG. 1E, the asynchronous gate control vector 33 comprises state control information for each of the packet gates 32 of the egress port 30A, wherein the letter "C" stands for a closed and the letter "o" stands for an open state of the packet gate. As explained before, the state defined by the asynchronous gate control vector 33 is only relevant for a specific packet gate 32 when, according to the mask 34, switching of that packet gate 32 is to be controlled asynchronously. It will be understood that, in an alternative implementation, the asynchronous gate control vector 33 may only comprise packet gate state control information for those packet gates 32 for which switching is to be controlled in an asynchronous manner according to the mask 34, i.e., the asynchronous gate control vector 33 may comprise packet gate state control information only for as many packet gates 32 as there are values set to "0" in the mask 34. To name but one further possible structure of the asynchronous gate control vector 33, there may be state control information stored in the asynchronous gate control vector 33 for each of the packets gates 32, wherein, however, for those packet gates 32 that are to be controlled in a synchronous manner according to the mask 34, there is not a state "C" or "o" stored in the asynchronous control vector 33, but a third value indicating that asynchronous gate control is not applicable for the respective packet gate 32. This is one example of an approach that may allow for omitting the mask 34 as it could be deduced from a value indicating that asynchronous gate control is not applicable for a specific packet gate 32 (named "third value" above) that switching control for said packet gate 32 is to be performed synchronously, i.e., according to time-based gate control list 35. In a similar manner, a third value, i.e., a value other than "C" or "o", indicating that synchronous gate control is not applicable for a specific packet gate 32 could be stored, for each point in time of the time pattern, in the time-based gate control list 35 to indicate use of asynchronous switching control for that packet gate 32 so as to make the mask 34 dispensable or so as to add redundancy. Similar to the asynchronous gate control vector 33, in one variant also the time-based gate control list 35 may only comprise packet gate state control information for those packet gates 32 for which switching is to be controlled in a synchronous manner.

Asynchronous packet gate switching control may also be effectuated by manipulating the content of the time-based gate control list 35 in an event-based manner. That is, when an event associated with a packet queue 52 occurs that is to cause switching of a specific packet gate 32 between the open state and the closed state, packet gate state control information stored in the time-based gate control list 35 may be set accordingly. In FIG. 1E, this is symbolized by the arrow extending from the packet queue 52A to the time-based gate control list 35 and the dashed arrow extending from packet queue 52B to the time-based gate control list 35. For example, if an event occurs that is to cause the packet gate to switch to the open state, an "o" may be written into the time-based gate control list 35 for that packet gate for at least one subsequent point in time of the time pattern, e.g., for all subsequent points in time. Vice versa, a "C" may be written into the time-based gate control list 35 if the event is to cause switching of the packet gate into the closed state. The packet gate state control information may again be overwritten to switch the packet gate back to the opposite state. It will be appreciated that for the purpose of asynchronous packet gate switching control, the time-based packet gate state control information in the time-based gate control list 35 may be based on a local time of the network element comprising the packet gate so that network synchronisation is not required for implementing asynchronous packet gate switching control using the time-based gate control list 35.

For the sake of simplicity, it is assumed in the following that a mask 34 is provided in the egress port 30A of FIG. 1E, that the content of the asynchronous gate control vector 33 and the content of the time-based gate control list 35 are structured as illustrated in the figure, that both the asynchronous gate control vector 33 and the time-based gate-control list 35 comprise state control information for each of the packet gates 32 of the egress port 30A, and that only the asynchronous gate control vector 33 is used for controlling packet gate switching in an asynchronous manner, not the time-based gate control list 35.

For a specific one of the packet gates 32 for which, according to the mask 34, switching is to be controlled in an asynchronous manner, the state control information in the asynchronous gate control vector 33 may change in accordance with the occurrence of an event associated with the packet queue 52 influencing switching control of that packet gate 32. For instance, if the respective packet gate 32 is in the closed state and its state control information in the asynchronous gate control vector 33 is "C" and an event associated with a packet queue 52 occurs that is to affect the state of the packet gate 32 in that it should assume the open state in response to the occurrence of the event, the state control information for the packet gate 32 in the asynchronous gate control vector 33 is changed to "o". The state control information in the asynchronous gate control vector 33 is thus variable. Also, a packet queue 52 may be enabled to control a corresponding value in the mask 34 as illustrated by the arrows extending from the packet queues 52A and 52B to the mask 34. For instance, an event associated with a packet queue 52 may determine whether asynchronous packet gate switching control or synchronous packet gate switching control is to be applied for a respective packet gate by setting the value in the mask 34 associated with that packet gate accordingly.

As before, it is once again assumed that there is provided a gate control signal controlling switching of the packet gate 32B between the open state and the closed state and that said gate control signal controls switching of the packet gate 32B based on the occurrence of an event associated with the packet queue 52A. In FIG. 1E, an arrow extending from the packet queue 52A to the asynchronous gate control vector 33 symbolizes the influence of an event associated with the packet queue 52A on the asynchronous gate control vector 33 (and on the switching of the packet gate 32B via the asynchronous gate control vector 33). The gate control signal for the packet gate 32B may again be provided by a processor 22 that has access to the asynchronous gate control vector 33, the mask 34 and the time-based gate control list 35. In one implementation, the processor 22 providing the gate control signal for the packet gate 32B may only have access to the asynchronous gate control vector but not to the mask 34 and/or the time-based gate control list 35. For instance, if the processor 22 does not have access to the mask 34, the processor 22 may receive a signal via its interface 24 (see FIG. 1A) indicating that the processor 22 is to provide a gate control signal in accordance with the asynchronous gate control vector 33 for the packet gate 32B. Updating the asynchronous gate control vector 33 in accordance with packet queue events may for instance also be performed by the processor 22 or by another processor located within the same network element or within another network element 20. Again, the processor 22 may form part of the network element 20 comprising the egress port 30A of FIG. 1E, another network element 20 or of the network controller 10 (see FIG. 1A). The content of the mask 34 and/or of the time-based gate control list 35 may for instance be provided to the network element 20 comprising the egress port 30A of FIG. 1E by the network controller 10 of FIG. 1A. It may also be determined by the network controller 10, specifically its processor 12. The dashed arrow extending from the packet queue 52B to the asynchronous gate control vector 33 in FIG. 1E represents the influence of an event associated with the packet queue 52B on the content of the asynchronous gate control vector 33 in case switching of one of the packet gates 32 is controlled based on the occurrence of an event associated with the packet queue 52B.

Figure 1F:
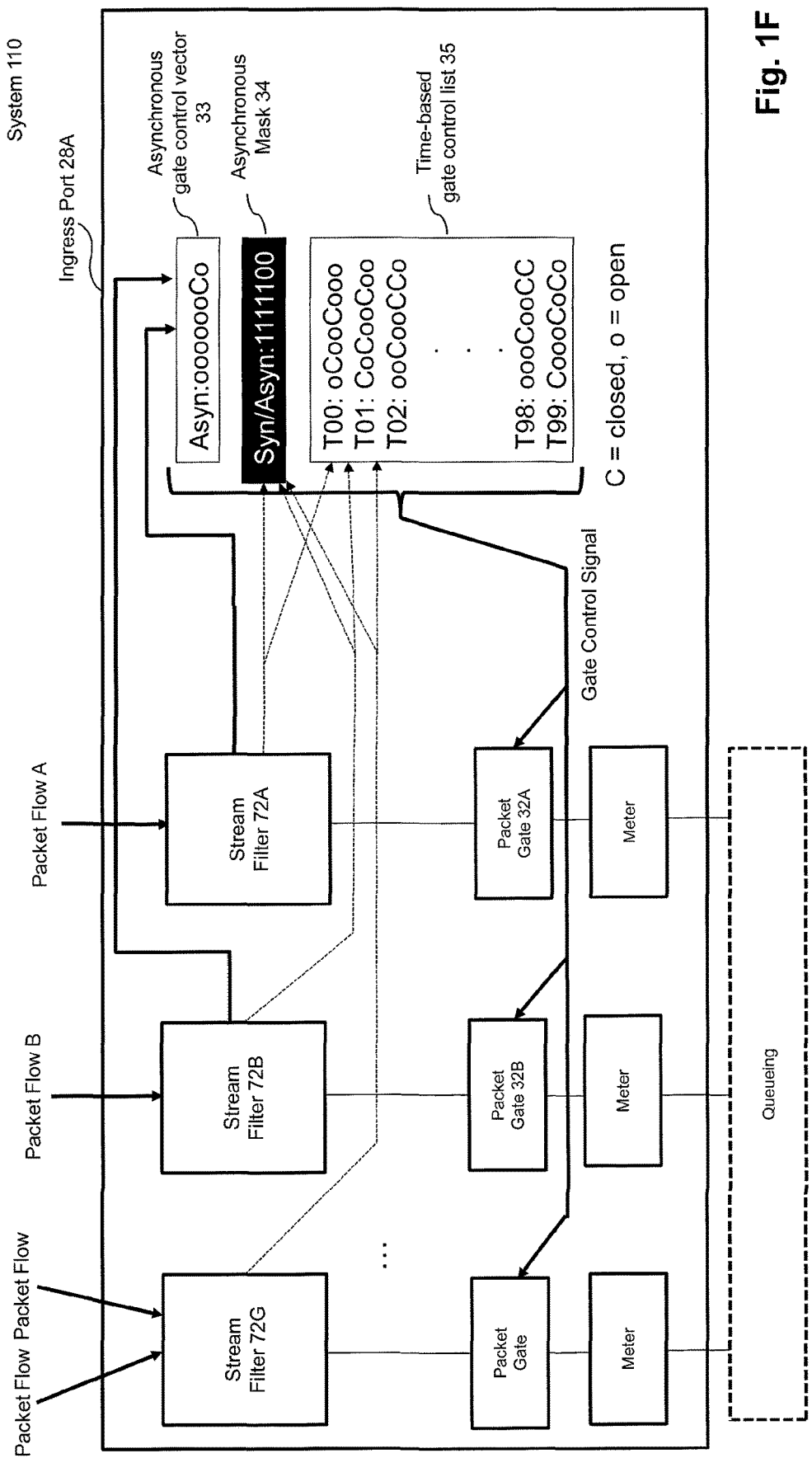
FIG. 1F illustrates an embodiment of a system comprising packet gates and stream filters in accordance with the present disclosure.

FIG. 1F illustrates an embodiment of a system 110 comprising packet gates 32A, 32B and stream filters 72A, 72B, 72G in accordance with the present disclosure. The system 110 comprises an ingress port, which may, for instance, be the ingress port 28A of the network element 20 as illustrated in FIG. 1A. The system 110 of FIG. 1F exhibits some similarities to that of FIG. 1E and focus is put on the differences of the system 110 of FIG. 1F as compared to the system of FIG. 1E.

A main difference to the system of FIG. 1E is that, in the system 110 of FIG. 1F, events based on whose occurrence switching of a packet gate 32 between the open state and the closed state is controlled are associated with a respective stream filter 72A, 72B, 72G at the ingress port 28A as a packet processing element, not with packet queues as packet processing elements. It is common to FIG. 1F and FIG. 1E that controlling switching of a packet gate 32 based on the occurrence of an event i.e., asynchronous packet gate switching control, is implemented in the environment of a system allowing time-based, i.e., synchronous, packet gate switching control. Thus, also in the system 110 of FIG. 1F, asynchronous and synchronous packet gate switching control may be combined and a time-based gate control list 35, an asynchronous gate control vector 33 and a mask 34 are provided. Regarding the configurations of the time-based gate control list 35, the asynchronous gate control vector 33 and the mask 34, the explanations provided above apply analogously.

Similar to what has been explained with reference to the system of FIG. 1E, also in the system 110 of FIG. 1F asynchronous packet gate switching control may also be effectuated by manipulating the content of the time-based gate control list 35 in an event-based manner. That is, when an event associated with a stream filer 72 occurs that is to cause switching of a specific packet gate 32 between the open state and the closed state, packet gate state control information stored in the time-based gate control list 35 may be set accordingly. In FIG. 1F, this is symbolized by the arrow extending from the stream filter 72A to the time-based gate control list 35 and the dashed arrow extending from stream filter 72B to the time-based gate control list 35.

For the sake of simplicity, it is assumed in the following that a mask 34 is provided in the ingress port 28A of FIG. 1F, that the content of the asynchronous gate control vector 33 and the content of the time-based gate control list 35 are structured as illustrated in the figure, that both the asynchronous gate control vector 33 and the time-based gate-control list 35 comprise state control information for each of the packet gates 32 of the ingress port 28A, and that only the asynchronous gate control vector 33 is used for controlling packet gate switching in an asynchronous manner, not the time-based gate control list 35.

For a specific one of the packet gates 32 for which, according to the mask 34, switching is to be controlled in an asynchronous manner, the state control information in the asynchronous gate control vector 33 may change in accordance with the occurrence of an event associated with the stream filter 72 influencing switching control of that packet gate 32. For instance, if the respective packet gate 32 is in the closed state and its state control information in the asynchronous gate control vector 33 is "C" and an event associated with a stream filter 72 occurs that is to affect the state of the packet gate 32 in that it should assume the open state in response to the occurrence of the event, the state control information for the packet gate 32 in the asynchronous gate control vector 33 is changed to "o". The state control information in the asynchronous gate control vector 33 is thus variable.

In one implementation, the event can be that a stream filter detects a malfunctioning stream, e.g., seriously exceeds an agreed bandwidth, continuously repeats the same packet etc. In this case, the entry in the mask 34 for the corresponding packet gate 32 may be set to zero and the packet gate control information for the packet gate 32 in the asynchronous gate control vector 33 may be set to "C" in order to block the malfunctioning stream.

In FIG. 1F, an arrow extending from the stream filter 72A to the asynchronous gate control vector 33 symbolizes the influence of an event associated with the stream filter 72A on the asynchronous gate control vector 33 (and on the switching of the packet gate 32B via the asynchronous gate control vector 33). The gate control signal for the packet gate 32B may again be provided by a processor 22 that has access to the asynchronous gate control vector 33, the mask 34 and the time-based gate control list 35. In one implementation, the processor 22 providing the gate control signal for the packet gate 32B may only have access to the asynchronous gate control vector but not to the mask 34 and/or the time-based gate control list 35. For instance, if the processor 22 does not have access to the mask 34, the processor 22 may receive a signal via its interface 24 (see FIG. 1A) indicating that the processor 22 is to provide a gate control signal in accordance with the asynchronous gate control vector 33 for the packet gate 32B. Updating the asynchronous gate control vector 33 in accordance with stream filter events may for instance also be performed by the processor 22 or by another processor located within the same network element or within another network element 20. Again, the processor 22 may form part of the network element 20 comprising the ingress port 28A of FIG. 1F, another network element 20 or of the network controller 10 (see FIG. 1A). The content of the mask 34 and/or of the time-based gate control list 35 may for instance be provided to the network element 20 comprising the ingress port 28A of FIG. 1F by the network controller 10 of FIG. 1A. It may also be determined by the network controller 10, specifically its processor 12. The arrow extending from the stream filter 72B to the asynchronous gate control vector 33 in FIG. 1F represents the influence of an event associated with the stream filter 72B on the content of the asynchronous gate control vector 33 in case switching of one of the packet gates 32 is controlled based on the occurrence of an event associated with the stream filter 72B.

In one implementation, there are more stream filters than gates.

Figure 1G:
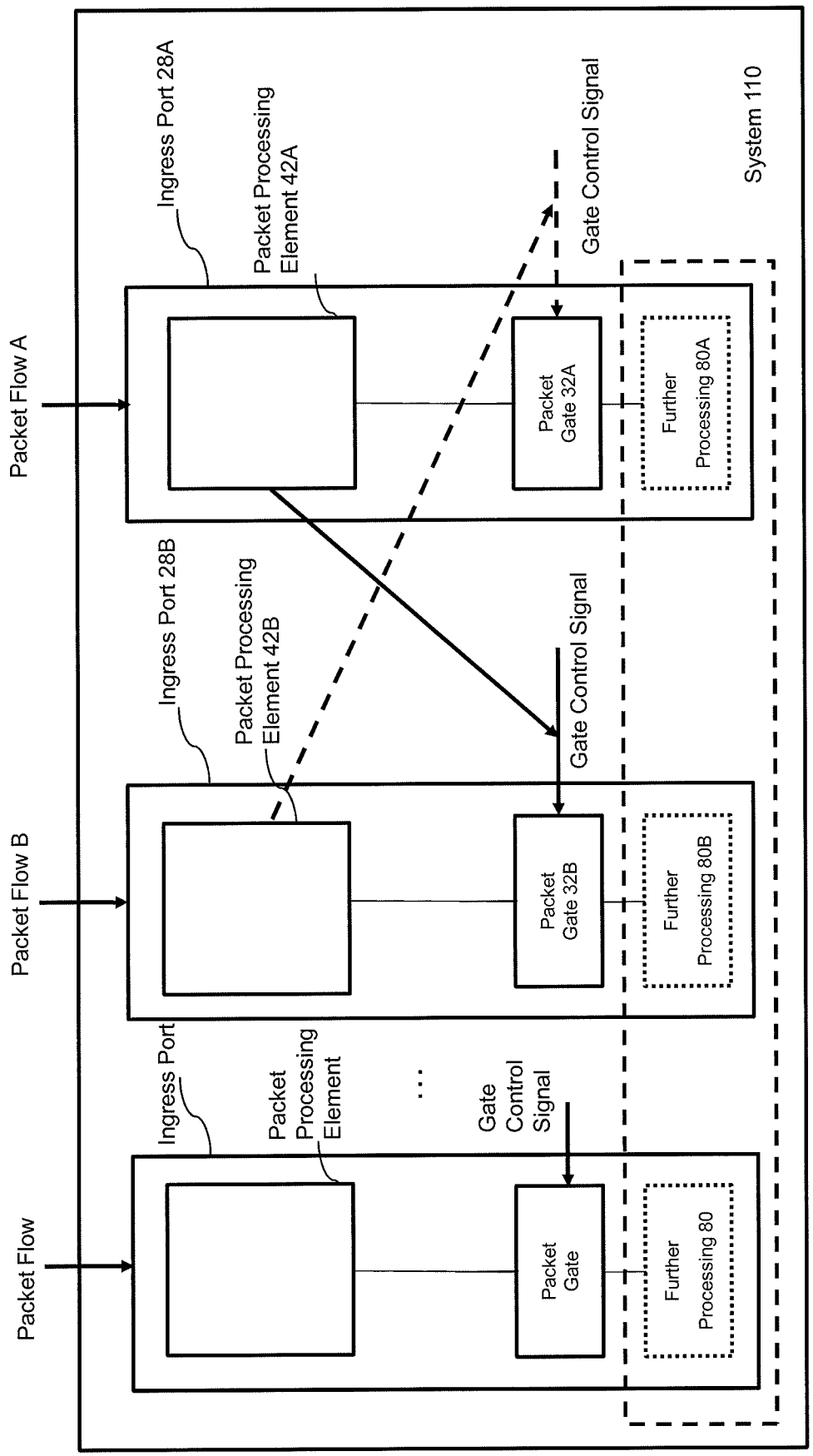
FIG. 1G illustrates an embodiment of a system comprising packet gates and packet processing elements in accordance with the present disclosure.

FIG. 1G illustrates an embodiment of a system 110 comprising packet gates 32A, 32B and packet processing elements 42A, 42B in accordance with the present disclosure. FIG. 1G generalizes the embodiment of system 110 illustrated in FIG. 1B and implements an embodiment of a system according to the sixth aspect of the present disclosure that is operated according to an embodiment of a method according to the ninth aspect of the disclosure. Accordingly, focus is put on the differences of the system 110 of FIG. 1G compared to the system of FIG. 1B.

Instead of packet queues 52 as in the system of FIG. 1B, the system 110 of FIG. 1G comprises generic packet processing elements 42. A generic packet processing elements 42 may represent any packet processing element. For instance, a packet processing elements 42 may be a packet queue (as in FIG. 1B to 1E) or a stream filter (as in FIG. 1F). Also, instead of transmission selection functions 56 as in the system of FIG. 1B, the system 110 of FIG. 1G comprises elements 80 for generic further packet processing, which may or may not comprise transmission selection.

The state of the packet gate 32B is controlled by a gate control signal, i.e., it is switched between the open state and the closed state according to the control signal. The gate control signal is generated by the processor 22. The processor 22 is configured to control switching of the packet gate 32B between the open state and the closed state based on the occurrence of a first event associated with the packet processing element 42A to trigger transmission of the packets of packet flow A in a relative transmission order among the packets of packet flow A and the packets of packet flow B. Thus, in the scenario of FIG. 1G, the control signal for the packet gate 32B is configured to control switching of the packet gate 32B accordingly. The influence of an event associated with the packet processing element 42A on the gate control signal for the packet gate 32B is symbolized by the arrow extending from the packet processing element 42A to the arrow representing the gate control signal for packet gate 32B.

In one implementation, also the state of packet gate 32A is controlled by a gate control signal. In one variant of the implementation comprising packet gate 32A being controlled by a gate control signal, the respective processor is configured to control switching of packet gate 32A between the open state and the closed state based on the occurrence of a second event associated with the packet processing element 42B. The potential influence of an event associated with the packet processing element 42B on the gate control signal for packet gate 32A is symbolized by the dashed arrow extending from the packet processing element 42B to the arrow representing the gate control signal for packet gate 32A.

Figure 2B:
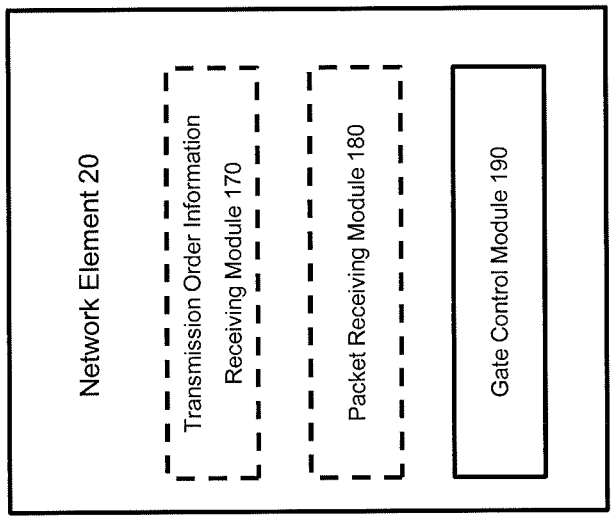
FIGS. 2A and 2B illustrate a further network controller embodiment and a further network element embodiment in accordance with the present disclosure.
Figure 2A:
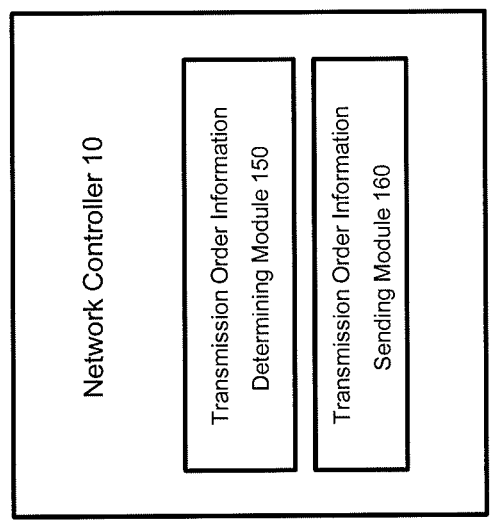

FIGS. 2A and 2B show functional embodiments of the network controller 10 and of one of the network elements 20, respectively. These functional embodiments may be based on the structural embodiments discussed above with reference to FIGS. 1A to 1G.

As illustrated in FIG. 2A, the network controller 10 comprises a transmission order information determining module 150 and a transmission order information sending module 160. As illustrated in FIG. 2B, the network element 20 comprises a transmission order information receiving module 170, a packet receiving module 180 and a gate control module 190. The transmission order receiving module 170 and the packet receiving module 180 are optional, the corresponding blocks are therefore drawn with dashed lines. Each of the network controller 10 and the network element 20 may comprise one or more further modules as needed.

Figure 2C:
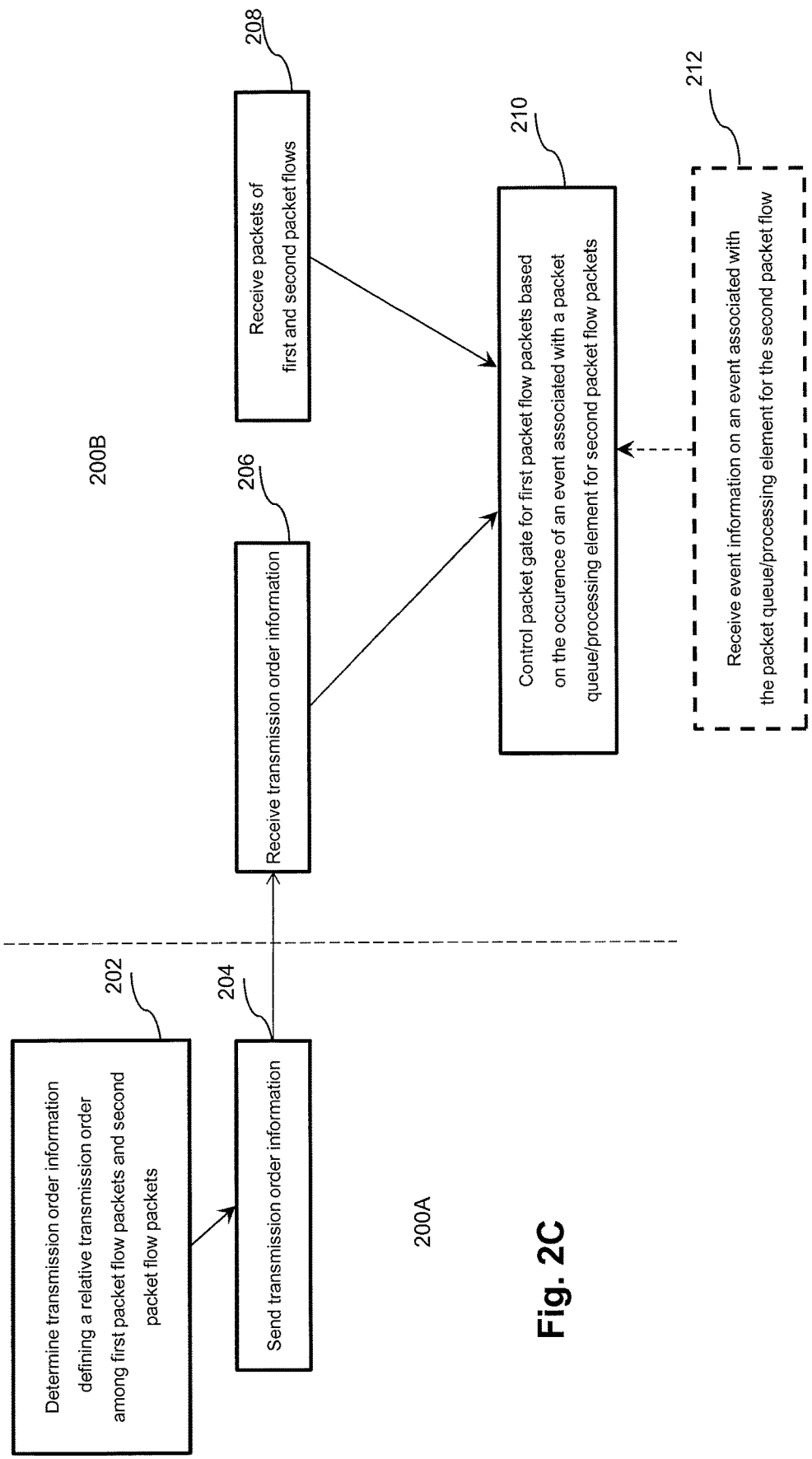
FIG. 2C illustrates flow charts of a method embodiment performed by a network controller and a method embodiment performed by a network element in accordance with the present disclosure.

FIG. 2C illustrates in two flow charts 200A, 200B exemplary method embodiments performed by the network controller 10 and one or more network elements 20, respectively. The network controller 10 and the one or more network elements 20 may be configured as explained above with reference to FIGS. 1A to 1G, 2A and 2B, respectively. The method embodiments generally target at achieving a specific relative transmission order of the first and second packet flow packets using asynchronous, event-based packet gate switching control.

Figure 3:
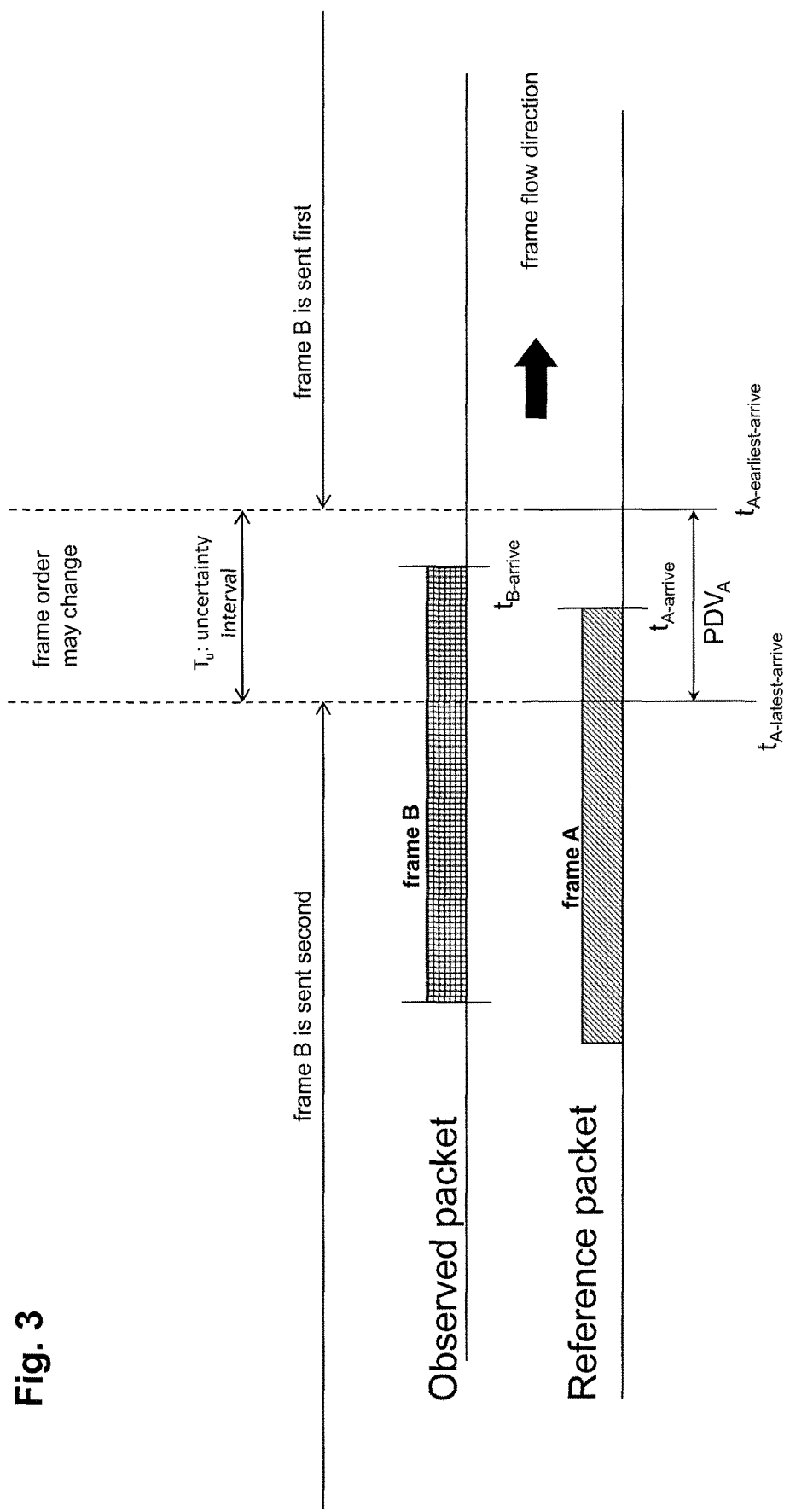
FIG. 3 illustrates the relative arrival of packets of different packet flows and potential impact on the relative packet transmission order.

FIG. 3 illustrates the relative arrival of a packet of a packet flow A and a packet of a packet flow B at a first network element and potential impact on the relative packet transmission order. In the illustrated example, both packet flows may be packet flows of the same traffic handling class, specifically of an express class, and they both have the same constant bitrate. Alternatively, they may be packet flows of different traffic handling classes and/or the packet flow B may be a variable bitrate flow. As shown in FIG. 3, the packets or frames A of packet flow A have a packet delay variation $PDV_A$ determined by the earliest possible arrival time $t_{A\text{-}earliest\text{-}arrive}$ at the first network element and the latest possible arrival time $t_{A\text{-}latest\text{-}arrive}$. As shown in the figure, due to the packet delay variation $PDV_A$, the relative arrival of a packet or frame B of packet flow B with respect to frame A at the first network element is not deterministic. Accordingly, assuming that a frame will be forwarded immediately when there is no concurrent frame, while frame B will be forwarded before frame A if it arrives earlier than $t_{A\text{-}earliest\text{-}arrive}$, and after frame A if it arrives later than $t_{A\text{-}latest\text{-}arrive}$, if frame B arrives at a point in time $t_{B\text{-}arrive}$ in between $t_{A\text{-}earliest\text{-}arrive}$ and $t_{A\text{-}latest\text{-}arrive}$, it is not known in advance which of frames A and B arrives earlier at the first network element. Thus, a race condition occurs, which is sometimes also referred to as fan-in. Without a countermeasure, it would therefore be variable, i.e., nondeterministic, which of frames A and B is transmitted earlier from the first network element towards a second network element downstream the first network element. Thus, the relative transmission order of packets of packet flows A and B is nondeterministic if observed packet B arrives between $t_{A\text{-}earliest\text{-}arrive}$ and $t_{A\text{-}latest\text{-}arrive}$ of reference packet A, $t_{A\text{-}earliest\text{-}arrive}$ and $t_{A\text{-}latest\text{-}arrived}$ define an uncertainty interval $T_U$ regarding the relative packet transmission order.

Returning to FIG. 2C, the illustrated methods may for instance relate to the handling of time critical traffic. As an example, the time critical traffic can be fronthaul traffic (see example of FIG. 4 discussed below) between one or more radio equipment items (RRUs in FIG. 4) and one or more radio equipment controllers (DUs in FIG. 4). In such a scenario, the one or more network elements 20 illustrated in FIG. 1A may be located between the one or more items of radio equipment and the one or more radio equipment controllers and constitute a portion of the fronthaul connection. It will be appreciated that the fronthaul connection is just one example, and that the present disclosure can also be implemented in other scenarios, such as industrial automation, vehicular networking, avionics, and so on.

As shown in FIG. 2C, the operations performed by the network controller 10 include a step 202 of determining transmission order information defining a relative transmission order among first packet flow packets and second packet flow packets.

For instance, in the scenarios of FIG. 1B to 1E, the packet flow A is allocated to the packet queue 52A associated with the packet gate 32A, and the packet flow B is allocated to the packet queue 52B associated with the packet gate 32B. The packet gate 32B may be switched between the open state and the closed state such that transmission of a first packet flow packet (e.g., a packet of flow A) via packet queue 52A, e.g., from an ingress port towards an egress port or from an egress port to a downstream network element, is followed by a transmission of a second packet flow packet (e.g., a packet of flow B) via packet queue 52B, which in turn is followed by a further transmission of a first packet flow packet via packet queue 52A, and so on. Switching may also be performed so that not only one packet of packet flow A is followed by one packet of packet flow B. Alternatively, several packets of packet flow A may be followed by one or several packets of packet flow B—or vice versa. To this end, the transmission selection 56A, 56B (or 56 in FIG. 1D and FIG. 1E) may select at least one packet of the respective packet flow for transmission via the respective packet gate 32A, 32B in its open state. The transmission order information determined in step 202 of flow chart 200A defines the relative transmission order among packets of the packet flow A and the packet flow B in accordance with the above explanations.

Once the transmission order information has been determined by the processor 12 in step 202, it is sent via the interface 14 of the network controller 10 to one or more network elements 20 in step 204.

Referring now to the operations of one individual network element 20 as illustrated in flow chart 200B of FIG. 2C, the transmission order information sent by the network controller 10 in step 204 is received by the individual network element 20 in step 206. The information is received via the interface 24 as shown in FIG. 1A and is then forwarded to the processor 22 for further processing and/or will be stored in the memory 26 for being accessed by the processor 22 as needed.

In a further step 208, packets belonging to first and second packet flows are received via the one or more ingress ports 28A, 28B of the network element 20. As explained above, in certain scenarios, a particular network element 20 will however receive in step 208 only a single packet flow at a dedicated ingress port. For instance, a first network element 20 comprising the ingress port 28B may receive the packet flow B in step 208. Another network element 20 comprising ingress port 28A may receive packet flow A outside the scope of step 208. Step 208 and step 206 can be performed in any order.

In optional step 212, event information on the occurrence of an event associated with the packet queue 52A or the packet processing element 42A is received at the network element 20 comprising the processor 22 configured to control switching of packet gate 32B. This step may be required only when the event information is not anyway accessible to the processor 22, for instance when the packet queue 52A/ the packet processing element 42A and the processor 22 are not arranged in the same network element 20.

In step 210, the processor 22 of the network element 20 controls switching of the packet gate 32B between the open state and the closed state based on the occurrence of an event associated with the packet queue 52A or the packet processing element 42A to trigger transmission of the packets of packet flow B in the relative transmission order among the packets of packet flow A and the packets of packet flow B packet defined by the transmission order information received in step 206. The transmission order information provided by the network controller 10 in step 204 thus causes switching of the packet gate 32B between the open state and the closed state based on the occurrence of a first event associated with the packet queue 52A or the packet processing element 42A to trigger transmission of packets of packet flow A and packets of packet flow B in the relative transmission order defined by the transmission order information. As an example, the departure or dequeuing of a packet of packet flow A from the packet queue 52A (or the packet processing element 42A in case it is a packet queue) or an arrival or enqueuing of such a packet at the packet queue 52A may be the event associated with the packet queue 52A. To name but one further example, a packet of packet flow A bypassing the packet queue 52 thus directly proceeding towards the packet gate 32A may also be such event. In case of the generic packet processing element 42A being a stream filter, the associated event may be examining and/or manipulating a packet by the stream filter.

If envisaged, packet gate 32A may likewise be controlled by a processor 22 configured to control switching of the packet gate 32A between the open state and the closed state.

In certain variants, the one or more network elements 20 may be located at an edge of a transport network domain (e.g., may constitute an edge node) towards one or more network elements that are located outside the transport network domain and that send the packets (e.g., the packet flow sources). In such a case the one or more network elements 20 may thus control the relative transmission order of the packets of packet flows A and B into the transport network domain by the packet gate switching control operation in step 210. Accordingly, a racing-less transport through the transport network domain may be facilitated. The relative transmission order achievable by the above-explained packet gate switching control technique may be applied locally at one network element 20 or on a global scope (e.g., across a larger set of network elements 20 handling packets of the packet flow A).

In the following description of further embodiments of the present disclosure, that are partially based on the embodiments discussed above, a radio network fronthaul scenario will be discussed in more detail with reference to FIG. 4.

Figure 4:
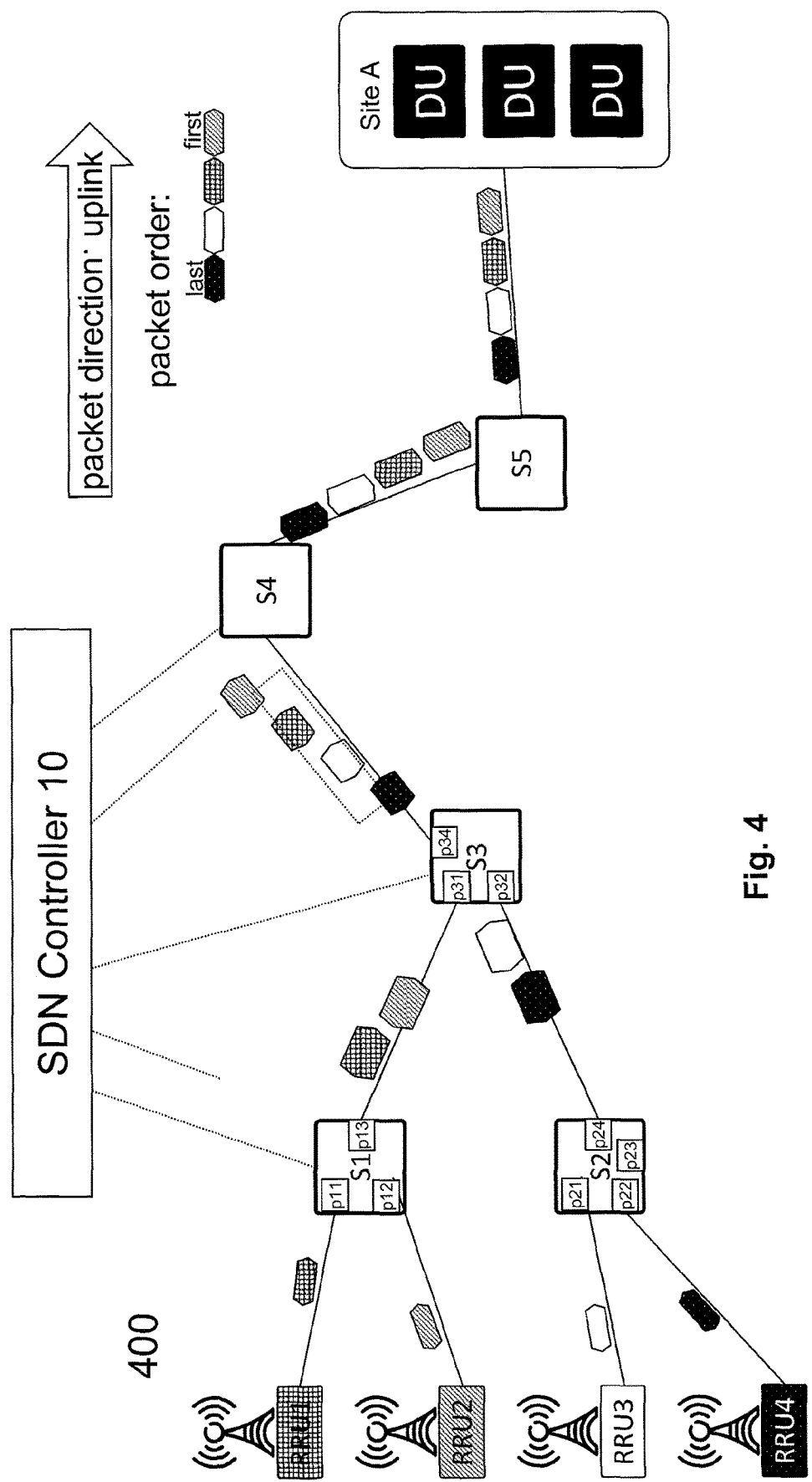
FIG. 4 illustrates another embodiment of a communication network in accordance with the present disclosure.

FIG. 4 shows an embodiment of a communication network 400 in which items of radio equipment in the form of Remote Radio Units (RRUs) acting as sources of respective packet flows and radio equipment controllers in the form of Digital Units (DUs), represented by the DUs located at site A in the figure, communicate via CPRI over an Ethernet switched transport network domain. Network elements in the transport network domain are denoted S1 to S5 and may for instance be realized as Ethernet bridges or switches. Therein, the network elements S1 and S2 are located at the edge of the transport network domain. Each network element S1 to S5 may represent a network element 20 as illustrated in FIGS. 1A to 1G and 2A and may be operated as illustrated in FIG. 2C.

In FIG. 4, each RRU is marked with a pattern, and the same pattern is used for the packets generated by the respective RRU. As an example, the pattern is "web" for RRU1 and the packet flow generated by RRU1, and "plain" for RRU3 and the packet flow generated by RRU3. In the exemplary case of CPRI, the packet flows are constant bitrate flows with packet rates that equal, or are multiples of, a common base bitrate (e.g., 614.4 Mbps). FIG. 4 exemplarily illustrates uplink packet flows, but the principles presented herein are equally applicable for downlink packet flows.

Packet processing by the network elements S1 to S5 in the transport network domain is controlled by a central network controller which, in the present embodiment, takes the form of a Software Defined Network (SDN) controller (SDNc) 10. The SDNc 10, is the network elements S1 to S5 may generally be configured to perform the method steps discussed above with reference to FIG. 2C. As such, the SDNc 10 may determine transmission order information defining a relative transmission order among first packet flow packets and second packet flow packets, and send the transmission order information to one or more respective network elements of the network elements S1 to S5 and to cause switching of a first packet gate associated with a first packet queue and configured to handle first packet flow packets between an open state for packet transmission and a closed state based on the occurrence of a first event associated with a second packet queue configured to handle second packet flow packets to trigger transmission of the first packet flow packets and the second packet flow packets in the relative transmission order.

The network topology illustrated in FIG. 4 represents a typical fronthaul deployment. In such deployments, often a comparatively simple topology (e.g., a tree structure, a partial mesh structure, limited hop counts, etc.) will be used due to the stringent synchronization and latency requirements of CPRI. It will in the following thus be assumed that each RRU generates a similar CPRI packet flow (e.g., the packet flows have the same constant bitrate). Moreover, it will be assumed that each packet flow is encapsulated in Ethernet frames having the same size. However, these are optional features. It should be noted that an Ethernet network is generally an asynchronous network.

Each of the network elements S1 to S5 comprises one or more ingress ports as well as one more egress ports (see also FIGS. 1A to 1G). The ports of an individual network element S1 to S5 in the transport network domain are continuously numbered. In the example of FIG. 4, network element S1, for instance, comprises ports p11, p12 and p13, wherein ports p11 and p12 are configured as ingress ports and port p13 is configured as egress port in the uplink processing scenario illustrated in FIG. 4.

One implementation of controlling switching of packet gate 32B between the open state for packet transmission and the closed state based on an event associated with the packet queue 52A that serves for storing packets of the packet flow A, the packet gate 32B serving, as illustrated in FIGS. 1B to 1G, for forwarding packets of the packet flow B in its open state, will be explained in the following. In the implementation now described, the event associated with the packet queue 52A is a packet departure from the packet queue 52A. The packet departure occurs when a packet of the packet flow A is dequeued from the packet queue 52A and then transmitted to a downstream network element or downstream port of the same network element via the packet gate 32A, which, in the present example, is constantly in its open state. Initially, the packet gate 32B is in the closed state. Thus, a packet of packet flow B arriving at the packet queue 52B is enqueued in the packet queue 52B and remains there at least until the packet gate 32B is opened for the first time. In the present example, the processor 22 that controls switching of the packet gate 32B is configured to control switching from the closed state to the open state based on the occurrence of the event, i.e., the packet departure from packet queue 52A. Furthermore, it is assumed that the packet flow A is a constant bitrate packet flow having a period $T_P$. The packet flow B may or may not be a constant bitrate packet flow. Moreover, it is assumed that the goal is to send, in one cycle, one packet of packet flow A followed by one or more packets of packet flow B.

Due to the packet gate 32A being constantly in the open state, when a packet of packet flow A arrives at the packet queue 52A, it may directly be forwarded towards a downstream network element via packet queue 52A and packet gate 32A. Thus, once it has been enqueued in the packet queue 52A, it may again be dequeued for transmission, thereby departing from the packet queue 52A. It will be appreciated that alternatively the arriving packet may also bypass the packet queue 52A and proceed directly to the packet gate 32A. A packet bypassing the packet queue may also be an event associate with the packet queue 52A that controlling switching of the packet gate 32B may be based on. However, as the processor 22 controlling switching of the packet gate 32B is, in the present example, configured to control switching from the closed state to the open state base on the occurrence of a packet departure from the packet queue 52A, the processor 22 controls the packet gate 32B to be switched to the open state when the packet of packet flow A is dequeued. Thus, switching of the packet gate 32B is controlled in an asynchronous manner based on the occurrence of a packet departure event.

The processor 22 controlling switching of the packet gate 32B is further configured to control switching of the packet gate 32B from the open state to the closed state after a predetermined duration of the open state. The predetermined duration is in the present case based on a the period $T_P$ of the constant bitrate of packet flow A and a tolerance margin, which in the present example corresponds to the packet delay variation $PDV_A$ regarding the arrival of a packets of packet flow A and thus the uncertainty interval $T_U$ (see FIG. 3 for an illustration of $PDV_A$ and $T_U$). Specifically, in the present example the predetermined duration is defined as $T_P$-$T_U$.

If the packet gate 32B is in the open state and a packet of packet flow B is stored in the packet queue 52B (which may already had been stored there before the packet gate 32B assumed the open state or may have arrived at and have been enqueued in the packet queue 52B in the open state), the packet may pass the packet gate 32B and may in principle be transmitted to a downstream network element. The transmission of the one packet of packet flow B is then effectuated by the transmission selection 56B. However, the transmission selection function 56B is configured to select at least one packet of the packet flow B for transmission via the packet gate 32B in the open state only if a remaining duration of the predetermined duration $T_P$-$T_U$ is at least a transmission time required for transmitting the at least one packet of packet flow B. Thus, a packet is only transmitted if the remaining opening time of the packet gate 32B is sufficient. When the predetermined duration $T_P$-$T_U$ has expired, the processor controls switching of the packet gate 32B so that the packet gate 32B is switched to the closed state. A new cycle in which again one packet of packet flow A is transmitted first and then followed by one or more packets of packet flow B begins.

Figure 5:
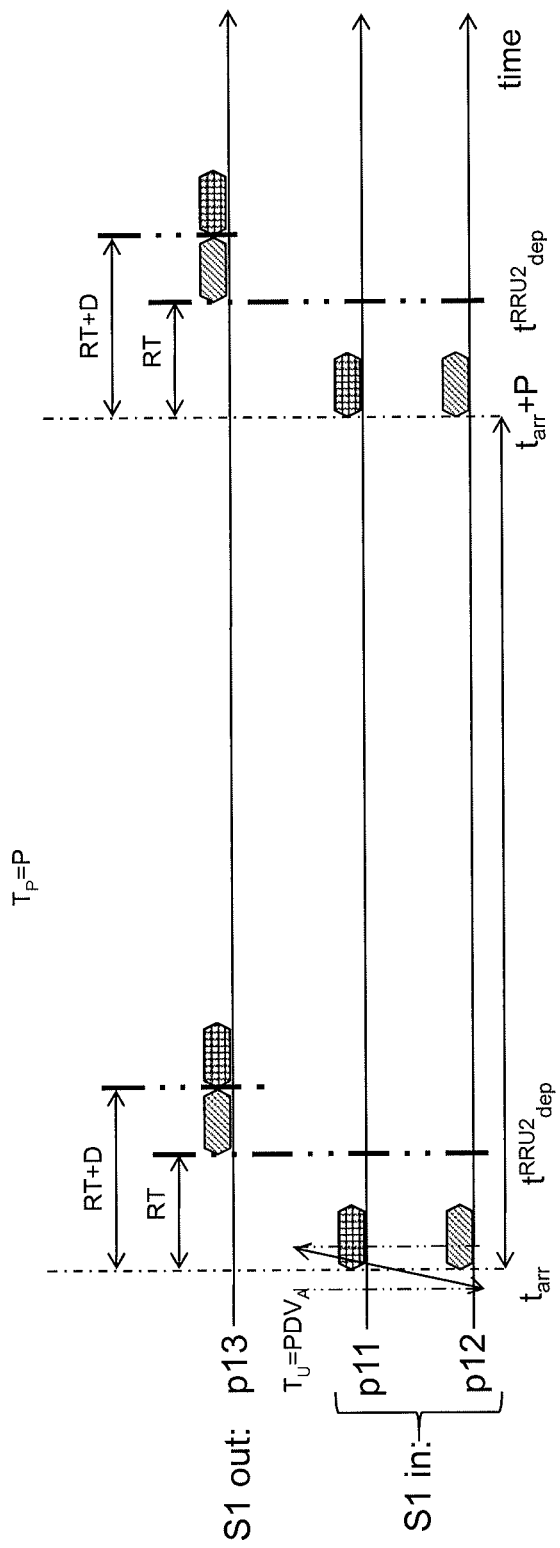
FIG. 5 is a schematic time diagram illustrating processing of two packets of different packet flows in the network of FIG. 4.

FIG. 5 is a schematic time diagram illustrating processing of two packets of different packet flows from RRU1 (packet flow B of FIG. 1 in the presently discussed example) and RRU2 (packet flow A) at the network element S1 in the network of FIG. 4 that can be achieved according to the presently elucidated implementation of controlling switching of the packet gate 32B.

In the scenario of FIG. 5 it will be assumed that RRU1 and RRU2 create periodic traffic with the same constant bitrate and with a time period P (i.e. $T_P$=P) between two subsequent packets of a particular packet flow, although this is generally not required and RRU1 may even create a variable bitrate packet flow B. Furthermore, it is assumed that the delay from RRU1 to S1 is the same as that from RRU2 to S1 and that the packets from RRU1 (packet flow B) and RRU2

(packet flow A) arrive at the ingress ports p11 and p12 of network element S1 at the same time $t_{arr}$. $t_{arr}$ may vary. Specifically, for the packet of the packet flow A, the time of arrival may, as indicated in the figure, vary by the packet delay variation $PDV_A$, which is identical to the uncertainty interval $T_U$, as explained above with respect to FIG. 3. Ingress ports p11 and p12 are User Network Interface (UNI) ports of network element S1.

In line with what has been explained above, the packet from RRU2 (packet flow A) will be sent out by the egress port p13 after the residence time RT. Once, the packet from RRU2 has departed, the packet gate 32B is switched from the closed state to the open state and the packet from the RRU1 (packet flow B) will be sent out the packet service time (denoted D) later (it is assumed that the remaining opening time of the packet gate 32B is sufficient for transmitting the packet from packet flow B). The departure time of the packet from RRU2 $t^{RRU2}_{dep}$ (packet flow A) thus precedes the departure time of the packet from RRU1 (packet flow B). When the predetermined duration $T_P$-$T_U$ has expired, the packet gate 32B is closed.

The arrival time $t_{arr}$+P of the subsequent packet of packet flow A from RRU2 may vary by the packet delay variation $PDV_A$ and may be after the arrival of the subsequent packet of packet flow B from RRU1. However, due to the packet gate 32B only being opened when the packet of packet flow A has departed the packet queue 52A, racing of the packets does not occur and the packet of packet flow A is in any circumstance sent before the packet of packet flow B. Thus, the relative transmission order among the packets of packet flows A and B is fixed.

To arrive at the desired relative transmission order as illustrated in FIG. 5, the packet queues 52A, 52B and the packet gates 32A, 32B referred to in the context of the presently discussed example may either be provided at one or more ingress ports (see FIG. 1B and FIG. 1C) or at one or more egress ports (see FIG. 1D, FIG. 1E).

A second implementation of controlling switching of packet gate 32B between the open state for packet transmission and the closed state based on an event associated with the packet queue 52A will be explained in the following. This implementation differs from the one described previously in that the goal is to send, in one cycle, a predetermined number N>1 of packets of packet flow A followed by one or more packets of packet flow B, i.e., the transmission selection 56A (see FIG. 1B) is configured to select a predetermined number of N>1 packets of packet flow A for transmission via the packet gate 32A in its open state and the event based on which the packet gate 32B is switched from the closed state to the open state is the departure of the predetermined number N>1 of packets of packet flow A from the packet queue 52A.

Figure 8:
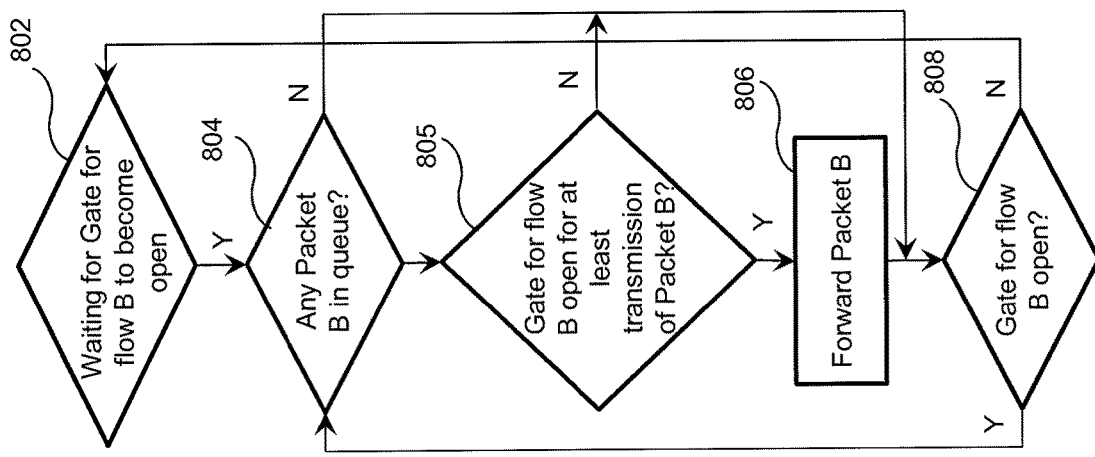
FIGS. 6 to 8 are flow charts illustrating processing of first and second packet flows in the context of a further method embodiment of the present disclosure.
Figure 7:
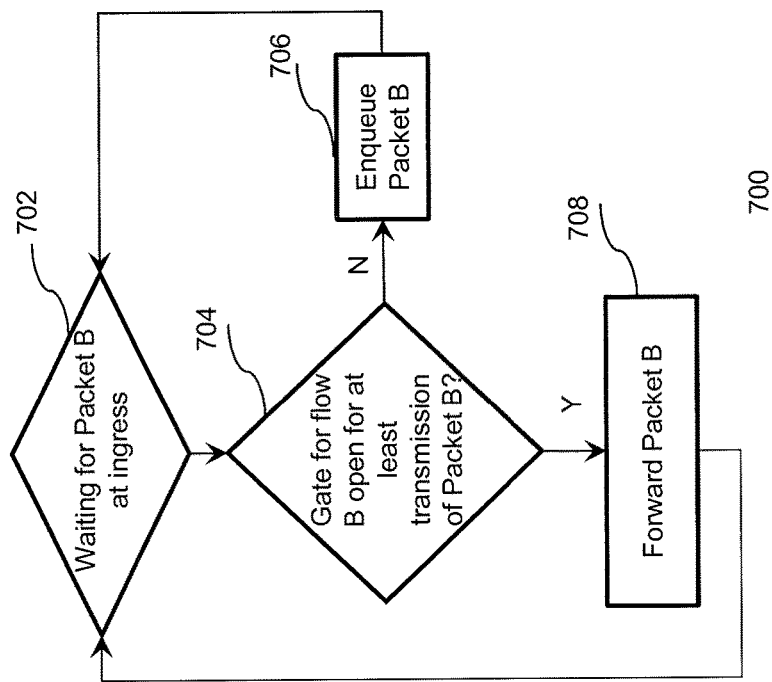
Figure 6:
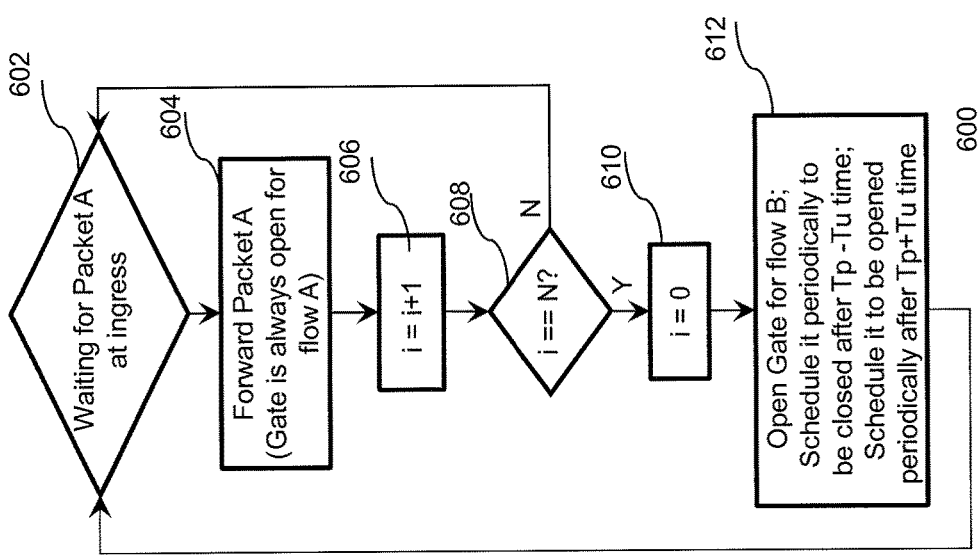

FIGS. 6 to 8 are flow charts illustrating processing of first and second packet flows in the context of a further method embodiment using the second implementation of packet gate switching control.

Specifically, the flow chart of FIG. 6 illustrates processing of packets of packet flow A leading to the packet gate 32B, which is initially in the closed state, being switched to the open state. As before, packet gate 32A is constantly in the open state. In step 602, it is waited for a first packet of packet flow A to arrive at the ingress port 28A. Upon arrival, the packet is enqueued in the packet queue 52A. As the packet gate 32A is in the open state and as there has not arrived any other packet before, the packet may be forwarded towards a downstream network element right away (step 604). Thus, the packet is again dequeued from the packet queue 52A, selected for transmission by the transmission selection 56A and transmitted via the packet gate 32A and the egress port 30A. Alternatively, if there has not arrived any other packet before, the arriving packet may also bypass packet queue 56A for direct transmission and the bypassing may be chosen as the event based on which switching control is performed as explained above. It will also be appreciated that it may also be checked, e.g., in the context of step 602 or in a step executed after step 602, for instance after a certain waiting duration thereof has expired, but before step 604, whether or not a packet is stored in the packet queue 52A. If so, it may be proceeded to step 604 and that packet may be forwarded even though a packet arrival may not have occurred while waiting in step 602.

Once a packet has been forwarded in step 604, a value of a counter variable i that is initially zero, is incremented by the transmission selection 56A in step 606. Subsequently, it is checked in step 608 whether the value of i is identical to N, i.e., whether or not the predetermined number of packets of packet flow A that are to be transmitted in each cycle before a first packet of packet flow B is transmitted has been transmitted. If not, it is returned to step 602 and waited for the arrival of a further packet of packet flow A. Once such a further packet has arrived, steps 604 to 608 are repeated, and so on. If, however, the check in step 608 yields that the value of i is identical to N, i.e., the predetermined number of packets has departed from packet queue 52A, the counter is reset in step 610 and in step 612, the packet gate 32B for packets of packet flow B is opened as the departure of the predetermined number N of packets of packet flow A is the event triggering opening of the packet gate 32B. To this end, the processor 22 controls switching of the packet gate 32B accordingly. Also in step 612, the processor 22 schedules, with a period time of Tp, switching of the packet gate 32B from the open state to the closed state after a predetermined duration $T_P$-$T_U$ in the open state. Loss of a packet of flow A may in principle cause the packet gate 32B for packets of packet flow B to remain closed throughout an entire period P. To avoid such situations, in step 612, the processor 22 may optionally also schedule switching of the packet gate 32B to open periodically after (Tp+Tu) time with a period time of Tp. The scheduling of the gate to be periodically opened may also be performed at another stage of the method illustrated in FIG. 6, i.e., it does not have to be performed after a number of N packets of packet flow A has arrived (i==N in step 608) and not even after a first packet of packet flow A has arrived at the ingress port 28A in step 602.

In the context of the embodiment of systems 110 as illustrated in FIG. 1E and FIG. 1F where asynchronous and synchronous packet gate switching control may be combined, scheduling periodic opening/closing of the packet gate 32B may be implemented using the time-based gate control list 35 in a manner similar to that of the technique comprising using the time-based gate control list 35 for asynchronous packet gate switching control explained above with reference to FIG. 1E and FIG. 1F. To this end, packet gate state control information in the time-based gate control list 35 may be set accordingly for the respective points in time.

The flow chart 700 of FIG. 7 illustrates processing of packets of packet flow B when the packet gate 32B is in the open state for the first time. In step 702, it is waited for a first packet of packet flow B to arrive at the ingress port 28B. Once a packet has arrived, it is checked in step 704 whether or not the remaining duration of the predetermined duration is at least a transmission time required for transmitting the packet. If not, the packet is enqueued in the packet queue 52B in step 706. However, if the remaining gate opening time is sufficient, bypassing the packet queue 52B, the packet of packet flow B is forwarded to a downstream network element via the packet gate 32B and the egress port 30B. Thereafter, step 702 is executed once again and another cycle begins. It will be understood that in addition or as an alternative to waiting for a packet arrival in step 702, it may be checked if a packet is already stored in packet queue 52B when the packet gate 32B is switched to the open state for the first time or in particular in a later cycle. If so, a step of dequeuing the packet from packet queue 52B may follow and the flow may likewise proceed to step 704. It will also be understood that a packet arriving in the open state of the packet gate 32B may be enqueued in the packet queue 52B—even if there is no packet stored there yet—instead of bypassing the packet queue 52B. In this case, the packet may be dequeued before it is forwarded in step 708. When the scheduled closing time for the packet gate 32B (see step 612 of FIG. 6) arrives, the processor 22 controls the packet gate 32B to be switched from the open to the closed state.

As illustrated in the flow chart 800 of FIG. 8, when the packet gate 32B is in the closed state—irrespective of whether or not it has been in the open state before—it is waited for the packet gate 32B to be switched to the open state (step 802). When the packet gate 32B has been switched to the open state, it is checked in step 804 whether or not a packet is stored in the packet queue 52B. If not, it is proceeded to step 808, where it is checked if the packet gate 32B is still in the open state. If the packet gate 32B is still open, execution of step 804 is repeated. Thus, as long as the packet gate 32B being in the open state is confirmed, it is continuously checked if in the meantime a packet has arrived and has been enqueued in the packet queue 52B. If it turns out in step 808 that the packet gate 32B has been switched to the closed state, it is returned to step 802 and thus waited for the packet gate 32B being opened again. However, if it is found in step 804 that a packet is stored in the packet queue 52B, similar to step 704 of flow chart 700, it is checked in step 805 whether or not the packet gate 32B will remain in the open state for at least the packet transmission time. If not, the packet remains in the packet queue 52B for forwarding in a later open state cycle of the packet gate 32B. However, if the remaining gate opening time is sufficient, the packet is dequeued and forwarded in step 806.

Figure 9:
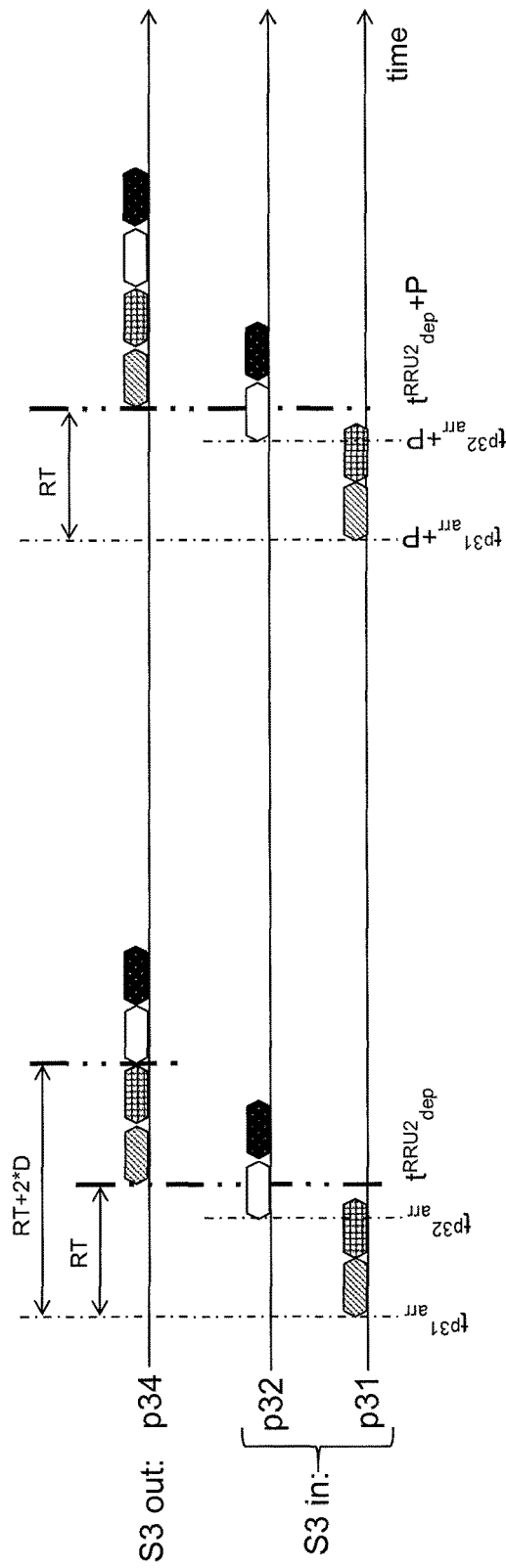
FIG. 9 is a schematic time diagram illustrating a packet processing embodiment in accordance with the present disclosure.

FIG. 9 exemplarily illustrates the operation of the network element S3. As shown in FIG. 4, the network element S3 is a core node of the transport network domain downstream of edge nodes S1 and S2. The network element S3 aggregates four time critical packet flows that are all forwarded towards network element S4 via egress port p34.

Network element S3 receives the already ordered packets of RRU2 and RRU1 (see also FIG. 5) at the ingress port p31 starting at $t^{p31}_{arr}$, whereas the packets of RRU3 and RRU4 already ordered using a technique as presented herein are received at the ingress port p32 starting at $t^{p32}_{arr}$. The already ordered packets of RRU2 and RRU1 received at the ingress port p31 of network element S3 and the already ordered packets of RRU3 and RRU4 received at ingress port p32 thereof may in generally have been ordered using any of the techniques as disclosed herein. Thus, one or more packet gates controlled according to a technique as presented herein may either be provided at one or more ingress ports (see FIG. 1B, FIG. 1C, FIG. 1F and FIG. 1G) or at one or more egress ports (see FIG. 1D, FIG. 1E). Accordingly, establishing a relative transmission order by controlling switching of packet gates provided at egress port as described in the following is just one of several possibilities.

The desired relative transmission order of the packets from RRU3 and RRU4, for instance, may be established by controlling switching of at least one packet gate at the egress port p24 of the network element S2 (see FIG. 4) accordingly. The egress port p24 may have the configuration of the egress port 30A illustrated in FIG. 1D or in FIG. 1E. The packets from RRU3 received at the ingress port p21 of the network element S2 may constitute the packet flow A in FIG. 1D or in FIG. 1E and the packets from RRU4 received at the ingress port p22 may constitute the packet flow B in FIG. 1D or in FIG. 1E. To distinguish the packets from RRU3 and those from RRU4 and feed them to the associated one of the packet queues 52A, 52B, they may for instance have different priority values, e.g., included in their respective associated VLAN tags. Switching of at least the packet gate 32B may then be controlled as disclosed herein to establish a relative transmission order among packets of the packet flows A (packets from RRU3) and B (packets from RRU4) wherein the packets of packet flow A are always transmitted first. The above explanations apply analogously to establishing a desired transmission order of the packets from RRU1 and RRU2 received at the ingress port 31 of the network element S3.

At the egress port p34 of the network element S3, two packet queues, each being associated with a respective packet gate, are provided. For illustrative purposes, processing of the packet flows at the network element S3 is again explained with reference to network element 20 assuming that the network element has an egress port 30A having the configuration illustrated in FIG. 1D or in FIG. 1E and assuming that the port p34 of the network element S3 corresponds to the egress port 30A of network element 20. In the present example, the packets received from RRU1 and RRU2 via network element S1 at the ingress port p31 of the network element S3 are fed to the egress port 30A and correspond to the packet flow A arriving at the egress port 30A of FIG. 1D or in FIG. 1E, whereas the already ordered packets of RRU3 and RRU4 received at the ingress port p32 are also fed to the egress port 30A but correspond to the packet flow B of FIG. 1D or in FIG. 1E. Packet flows A and B are both packet flows of an express traffic class.

So as to achieve that the packets originating from RRU1 and RRU2 are both fed to the packet queue 52A, i.e., the same packet queue, and that the packets originating from RRU3 and RRU4 are both fed to the packet queue 52B, priority translation may be required. If, as explained above, the packets from different RRUs have different priority values at the upstream network element S1 or S2 so as to have them fed to different packet queues there, but they are to be fed to the same packet queue at the network element S3 and the priority value there again decides to which packet queue packets are fed, the packets that are to be fed to the same packet queue may need to have assigned the same priority value, e.g., at the network element S3, after leaving their respective packet queues at the upstream network element S1 or S2. As one alternative to such a priority translation, internal priorities may be used at the network element S3, i.e., internal priorities may be assigned to the packets at the network element S3, in the present example before they are fed to the egress port p34, without overwriting the priorities in the VLAN tags that determined the packet queues to which the packets were fed at the upstream network element. The internal priorities at the network element S3 may then determine the packet queue to which a packet is fed at the network element S3, in particular at the egress port p34 thereof, without having an effect at any other network element.

As noted before, the egress port p34 may have the configuration of egress port 30A illustrated in FIG. 1D and in FIG. 1E. The packet gate 32A of the egress port p34 is again constantly in the open state. The transmission selection function 56 is configured to select two packets of packet flow A, i.e. the one packet from RRU2 and the one packet from RRU1, for transmission via the packet gate 32A in its open state. The processor 22 of the network element S3 is configured to control switching of the packet gate 32B from the closed state to the open state based on the occurrence of the departure of two packets from the packet queue 52A so that the packet gate 32B is opened when the packets from RRU1 and RRU2 have already left the packet queue 52A and are forwarded towards the network element S4 starting at $t^{RRU2}_{dep}$. The transmission selection 56 then selects two packets from the packet queue 52B for transmission via the packet gate 32B in its open state. Thus, the packets from RRU3 and RRU4 are transmitted at $t^{RRU2}_{dep}+2D$ after the packets from RRU2 and RRU1, wherein, as stated above, D is the packet service time. After the transmission of these packets, the packet gate 32B is again switched to the closed state, e.g., due to processor 22 controlling it accordingly after the expiration of a predetermined duration. A new cycle then begins with the arrival of another packet from RRU2 at $t^{P31}_{arr}+P$. Thus, in each cycle, one packet from RRU2 is transmitted followed by one packet from RRU1, one packet from RRU3 and one packet from RRU4. Accordingly, these packets from RRU1 to RRU4 leave the network element S3 as an ordered train of packets in which each packet of each packet flow always takes the same place in the order. It will be appreciated that although not shown in FIG. 4 and FIG. 9, there may one or more gaps between transmitted packets of a packet train.

It will be understood that while in the above examples an event based on which switching is controlled has been a packet departure, further events, e.g., packet arrival, packet queue bypassing or other types of events, may likewise serve as the basis for switching. Further, several packet gates may be controlled based on events associated with a packet queue that is in turn associated with another packet flow than the respective packet gate.

As has become apparent from the above description of exemplary embodiments, the disclosure presented herein can be used to achieve a desired transmission order of packets of different packet flows, wherein, for instance, a chosen packet flow may be prioritized over another packet flow, by controlling packet gate switching for a first packet flow based on an event associated with a packet queue for a second packet flow. As packet gate switching is thus event-based and performed in an asynchronous manner, not time-based, time synchronization of the network elements to permit a synchronized operation of the packet gates may not be required. Thus, measurements for coping with synchronization inaccuracy do not have to be taken. Accordingly, applying tolerance time for packet arrival with the consequence of lost bandwidth may be avoided.

While the present disclosure has been described in relation to exemplary embodiments, it is to be understood that this disclosure is only illustrative. Accordingly, it is intended that the invention be limited only by the scope of the claims appended hereto.

The invention claimed is:

1. A system comprising one or more network elements, having a plurality of packet gates to handle packet flow, and configured to process at least a first packet flow and a second packet flow, the system comprising:

a first packet gate selectively switchable between an open state for packet transmission and a closed state for non-transmission;

a first packet queue, wherein the first packet gate and the first packet queue are configured to handle first packet flow packets;

a second packet queue configured to handle second packet flow packets;

a mask having a plurality of binary values, in which a value of each binary value of the plurality of binary values to identify switching operation of a respective packet gate of the plurality of the packet gates, wherein a first value indicates time-based switching and a second value indicates switching responsive to an occurrence of an event; and at least one processor configured to control switching of the first packet gate between the open state and the closed state based on a respective binary value of the mask for the first packet gate, wherein when the respective binary value of the mask for the first packet gate has the first value, the at least one processor controls switching of the first packet gate in a time-based manner and wherein when the respective binary value of the mask for the first packet gate has the second value, an occurrence of a first event associated with the second packet queue triggers the first packet gate to switch to the open state for a predetermined duration for transmission of the first packet flow packets in a relative transmission order among the first packet flow packets and the second packet flow packets.

2. The system of claim 1, wherein the system further comprises:

a second packet gate, selectively switchable between the open state for packet transmission and the closed state for non-transmission, and associated with the second packet queue, the second packet gate configured to handle the second packet flow packets.

3. The system of claim 2, wherein the second packet gate is constantly in the open state.

4. The system of claim 2, wherein the at least one processor is further configured to control switching of the second packet gate between the open state and the closed state based on a binary value of the mask for the second packet gate.

5. The system of claim 4, wherein the at least one processor is configured to control switching of the second packet gate between the open state and the closed state based on an occurrence of a second event associated with the first packet queue, when the binary value of the mask for the second packet gate has the second value.

6. The system of claim 5, wherein at least one of the first event and the second event is a packet arrival at the associated packet queue.

7. The system of claim 5, wherein at least one of the first event and the second event is a packet bypassing the associated packet queue.

8. The system of claim 2, wherein the at least one processor is configured to select a predetermined number of second packet flow packets for transmission via the second packet gate in the open state of the second packet gate.

9. The system of claim 1, wherein the at least one processor is configured to select a predetermined number of first packet flow packets for transmission via the first packet gate in the open state of the first packet gate.

10. The system of claim 1, wherein the at least one processor configured to control switching of the first packet gate between the open state and the closed state is further configured to control the first packet gate to periodically switch from the closed state to the open state, when operating in the time-based manner based on the mask.

11. A network controller configured to control processing of at least a first packet flow and a second packet flow by a system having a plurality of packet gates to handle packet flow, wherein the network controller uses a mask to identify a manner of switching of the plurality of packet gates between time-based switching and switching responsive to an occurrence of an event, in which the system having a first packet gate, selectively switchable between an open state for packet transmission and a closed state for non-transmission, is associated with a first packet queue to handle first packet flow packets, and the system having a second packet queue configured to handle second packet flow packets, the network controller comprising:
- at least one processor configured to determine transmission order information defining a relative, transmission order among the first packet flow packets and the second packet flow packets and to determine the manner of switching of the first packet gate by determining a respective binary value for the first packet gate from the mask having a plurality of binary values, in which a value of each binary value of the plurality of binary values identities switching operation of a respective packet gate of the plurality of the packet gates, wherein a first value indicates time-based switching and a second value indicates switching responsive to an occurrence of an event; and
- an interface configured to send the transmission order information to the system, wherein the transmission order information is configured responsive to, when the respective binary value of the mask for the first packet gate has the first value, the at least one processor controls switching of the first packet gate in a time-based manner and when the respective binary value of the mask for the first packet gate has the second value, an occurrence of a first event associated with the second packet queue triggers the first packet gate to switch to the open state for a predetermined duration for transmission of the first packet flow packets and the second packet flow packets in the relative transmission order.

12. The network controller of claim 11, wherein the interface is configured to send first event information on the occurrence of the first event associated with the second packet queue to the system.

13. The network controller of claim 11, wherein
the system comprises a second packet gate, selectively switchable between the open state for packet transmission and the closed state for non-transmission, and associated with the second packet queue, the second packet gate configured to handle the second packet flow packets, and
the transmission order information is configured to cause switching of the second packet gate between the open state and the closed state.

14. The network controller of claim 13, wherein switching of the second packet gate is based on an occurrence of a second event associated with the first packet queue, when the binary value of the mask for the second packet gate has the second value.

15. The network controller of claim 14, wherein the interface is configured to send second event information on the occurrence of the second event associated with the first packet queue to the system.

16. The network controller of claim 11, wherein the network controller is configured to send the transmission order information to multiple network elements in the system to define the same packet order throughout a communication network.

17. A method of operating a system comprising one or more network elements and configured to process at least a first packet flow and a second packet Dow, in which the system has a plurality of packet gates to handle packet flow the method comprising:
- determining a respective binary value for a first packet gate from a mask having a plurality of binary values, in which a value of each binary value, of the plurality of binary values identifies switching operation of a respective packet gate of the plurality of the packet gates, wherein a first value indicates time-based switching and a second value indicates switching responsive to an occurrence of an event, in which a first packet gate, selectively switchable between an open state for packet transmission and a closed state for non-transmission, is associated with a first packet queue to handle first packet flow packets, and the system having a second packet queue configured to handle second packet flow packets;
- in response to the respective binary value of the mask for the first packet gate having the first value, the first packet gate switches in a time-based manner; and
- in response to a the respective binary value of the mask for the first packet gate having the second value, controlling switching of the first packet gate between the open state and the closed state based on an occurrence of a first event associated with the second packet queue, in order to trigger the first packet gate to switch to the open state for a predetermined duration for transmission of the first packet flow packets in a relative transmission order among the first packet flow packets and the second packet flow packets.

18. A method of operating a network controller configured to control processing of at least a first packet flow and a second packet flow by a system having a plurality of packet gates to handle packet flow, wherein the network controller uses a to identify a manner of switching of the plurality of packet gates between time-based switching and switching responsive to an occurrence of an event, in which the system having a first packet gate, selectively switchable between an open state for packet transmission and a closed state for non-transmission, is associated with a first packet queue to handle first packet flow packets, and the system having a second packet queue configured to handle second packet flow packets, the method comprising:
- determining transmission order information defining a relative transmission order among the first packet flow packets and the second packet flow packets and to determine the manner of switching of the first packet gate by determining a respective binary value for the first packet gate from a mask having a plurality of binary values, in which a value of each binary value, of the plurality of binary values identifies switching operation of a respective packet gate of the plurality of the packet gates, wherein a first value indicates time-based switching and a second value indicates switching responsive to an occurrence of an event; and sending the transmission order information to the system, wherein the transmission order information is configured, responsive to, when the respective binary value of the mask for the first packet gate has the first value, controlling switching of the first packet gate in a time-based manner and when the respective binary value of the mask for the first packet gate has the second value, an occurrence of a first event associated with the second packet queue, triggers the first packet gate to switch to the open state for a predetermined duration for transmission of the first packet flow packets and the second packet flow packets in the relative transmission order.

\* \* \* \* \*